(12) United States Patent
Marcy et al.

(10) Patent No.: US 8,250,397 B2
(45) Date of Patent: *Aug. 21, 2012

(54) N-WAY SYNCHRONIZATION OF DATA

(75) Inventors: Scott Marcy, Colorado Springs, CO (US); Brent Eric Knight, Austin, TX (US)

(73) Assignee: Apple Inc., Cupertino, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 12/640,616

(22) Filed: Dec. 17, 2009

(65) Prior Publication Data

US 2010/0106687 A1 Apr. 29, 2010

Related U.S. Application Data

(63) Continuation of application No. 11/621,033, filed on Jan. 8, 2007, now Pat. No. 7,657,769.

(51) Int. Cl.
*G06F 7/20* (2006.01)
(52) U.S. Cl. ........................................ 713/375; 707/610
(58) Field of Classification Search ........................ None
See application file for complete search history.

(56) References Cited

U.S. PATENT DOCUMENTS

| | | | |
|---|---|---|---|
| 4,467,419 A | 8/1984 | Wakai |
| 4,558,413 A | 12/1985 | Schmidt et al. |
| 4,631,673 A | 12/1986 | Haas et al. |
| 4,761,737 A | 8/1988 | Duvall et al. |
| 4,792,909 A | 12/1988 | Serlet |
| 4,953,080 A | 8/1990 | Dysart et al. |
| 5,163,148 A | 11/1992 | Walls |
| 5,175,849 A | 12/1992 | Schneider |
| 5,201,044 A | 4/1993 | Frey, Jr. et al. |
| 5,276,860 A | 1/1994 | Fortier et al. |
| 5,287,496 A | 2/1994 | Chen et al. |
| 5,355,483 A | 10/1994 | Serlet |
| 5,369,757 A | 11/1994 | Spiro et al. |
| 5,375,232 A | 12/1994 | Legvold et al. |
| 5,379,412 A | 1/1995 | Eastridge et al. |
| 5,381,545 A | 1/1995 | Baker et al. |
| 5,386,554 A | 1/1995 | Nozaki |
| 5,403,639 A | 4/1995 | Belsan et al. |
| 5,454,103 A | 9/1995 | Coverston et al. |
| 5,481,721 A | 1/1996 | Serlet et al. |

(Continued)

FOREIGN PATENT DOCUMENTS

DE 39 19 802 A1 12/1989

(Continued)

OTHER PUBLICATIONS

Abuan et al.; U.S. Appl. No. 10/769,841, filed Feb. 2, 2004.

(Continued)

*Primary Examiner* — Dennis M Butler
(74) *Attorney, Agent, or Firm* — Wong, Cabello, Lutsch, Rutherford & Brucculeri, LLP

(57) ABSTRACT

The invention relates to the use of history information as an aid to synchronization in a peer-to-peer system. In particular, node trees are used to represent portions of files systems designated for synchronization. The nodes in the node tree embody history information regarding associated objects. The history information includes version vectors that are used to simplify synchronization-related comparisons and create job lists that may be used to bring participating peers into synchronization.

51 Claims, 11 Drawing Sheets

U.S. PATENT DOCUMENTS

| | | | |
|---|---|---|---|
| 5,487,160 | A | 1/1996 | Bemis |
| 5,490,246 | A | 2/1996 | Brotsky et al. |
| 5,594,900 | A | 1/1997 | Cohn et al. |
| 5,603,020 | A | 2/1997 | Hashimoto et al. |
| 5,627,996 | A | 5/1997 | Bauer |
| 5,636,359 | A | 6/1997 | Beardsley et al. |
| 5,636,360 | A | 6/1997 | Courts et al. |
| 5,642,501 | A | 6/1997 | Doshi et al. |
| 5,664,177 | A | 9/1997 | Lowry |
| 5,664,186 | A | 9/1997 | Bennett et al. |
| 5,687,370 | A | 11/1997 | Garst et al. |
| 5,710,900 | A | 1/1998 | Anand et al. |
| 5,710,922 | A | 1/1998 | Alley et al. |
| 5,727,202 | A | 3/1998 | Kucala |
| 5,742,752 | A | 4/1998 | DeKoning |
| 5,758,358 | A | 5/1998 | Ebbo |
| 5,764,972 | A | 6/1998 | Crouse et al. |
| 5,765,171 | A | 6/1998 | Gehani et al. |
| 5,771,379 | A | 6/1998 | Gore, Jr. |
| 5,778,411 | A | 7/1998 | DeMoss et al. |
| 5,806,078 | A | 9/1998 | Hug et al. |
| 5,819,275 | A | 10/1998 | Badger et al. |
| 5,832,489 | A | 11/1998 | Kucala |
| 5,884,323 | A | 3/1999 | Hawkins et al. |
| 5,918,229 | A | 6/1999 | Davis et al. |
| 5,946,689 | A | 8/1999 | Yanaka et al. |
| 5,991,771 | A | 11/1999 | Falls et al. |
| 6,000,000 | A | 12/1999 | Hawkins et al. |
| 6,006,231 | A | 12/1999 | Popa |
| 6,006,274 | A | 12/1999 | Hawkins et al. |
| 6,026,415 | A | 2/2000 | Garst et al. |
| 6,098,078 | A | 8/2000 | Gehani et al. |
| 6,098,079 | A | 8/2000 | Howard |
| 6,101,615 | A | 8/2000 | Lyons |
| 6,151,659 | A | 11/2000 | Solomon et al. |
| 6,188,995 | B1 | 2/2001 | Garst et al. |
| 6,233,648 | B1 | 5/2001 | Tomita |
| 6,240,414 | B1 | 5/2001 | Beizer et al. |
| 6,272,558 | B1 | 8/2001 | Hui et al. |
| 6,275,831 | B1 | 8/2001 | Bodnar et al. |
| 6,292,803 | B1 | 9/2001 | Richardson et al. |
| 6,295,541 | B1 | 9/2001 | Bodnar et al. |
| 6,304,884 | B1 | 10/2001 | Garst et al. |
| 6,308,201 | B1 | 10/2001 | Pivowar et al. |
| 6,311,193 | B1 | 10/2001 | Sekido |
| 6,317,754 | B1 | 11/2001 | Peng |
| 6,330,618 | B1 | 12/2001 | Hawkins et al. |
| 6,353,837 | B1 | 3/2002 | Blumenau |
| 6,360,272 | B1 | 3/2002 | Lincke et al. |
| 6,389,423 | B1 | 5/2002 | Sakakura |
| 6,397,311 | B1 | 5/2002 | Capps |
| 6,401,112 | B1 | 6/2002 | Boyer et al. |
| 6,446,088 | B1 | 9/2002 | Vaduvur et al. |
| 6,457,062 | B1 | 9/2002 | Pivowar et al. |
| 6,466,950 | B1 | 10/2002 | Ono |
| 6,505,215 | B1 | 1/2003 | Kruglikov et al. |
| 6,516,327 | B1 | 2/2003 | Zondervan et al. |
| 6,539,381 | B1 | 3/2003 | Prasad et al. |
| 6,553,037 | B1 | 4/2003 | Pivowar et al. |
| 6,571,262 | B2 | 5/2003 | Garst et al. |
| 6,651,137 | B2 | 11/2003 | Baek et al. |
| 6,654,772 | B1 | 11/2003 | Crow et al. |
| 6,671,772 | B1 | 12/2003 | Cousins |
| 6,717,599 | B1 | 4/2004 | Olano |
| 6,748,504 | B2 | 6/2004 | Sawdon et al. |
| 6,757,896 | B1 | 6/2004 | Cohen et al. |
| 6,775,679 | B2 | 8/2004 | Gupta |
| 6,823,336 | B1 | 11/2004 | Srinivasan et al. |
| 6,829,617 | B2 | 12/2004 | Sawdon et al. |
| 6,868,417 | B2 | 3/2005 | Kazar et al. |
| 6,901,479 | B2 | 5/2005 | Tomita |
| 6,925,477 | B1 | 8/2005 | Champagne et al. |
| 6,928,467 | B2 | 8/2005 | Peng |
| 6,981,171 | B2 | 12/2005 | Hashemi |
| 6,983,277 | B2 | 1/2006 | Yamaguchi et al. |
| 7,043,637 | B2 | 5/2006 | Bolosky et al. |
| 7,085,784 | B2 | 8/2006 | Krishna et al. |
| 7,085,785 | B2 | 8/2006 | Sawdon et al. |
| 7,149,761 | B2 | 12/2006 | Cooke et al. |
| 7,181,521 | B2 | 2/2007 | Knauerhase et al. |
| 7,216,135 | B2 | 5/2007 | Sawdon et al. |
| 7,216,199 | B2 | 5/2007 | Mizuno |
| 7,216,289 | B2 | 5/2007 | Kagle et al. |
| 7,280,996 | B2 | 10/2007 | Hayakawa et al. |
| 7,290,019 | B2 | 10/2007 | Bjorner et al. |
| 7,406,499 | B2 | 7/2008 | Singh et al. |
| 7,426,563 | B2 | 9/2008 | Morita et al. |
| 7,430,640 | B2 | 9/2008 | Schmuck et al. |
| 7,502,801 | B2 | 3/2009 | Sawdon et al. |
| 7,506,007 | B2 | 3/2009 | Bjorner |
| 7,512,638 | B2 | 3/2009 | Jhaveri et al. |
| 7,523,146 | B2 | 4/2009 | Holt et al. |
| 7,606,881 | B2 | 10/2009 | Chasman et al. |
| 7,610,387 | B1 | 10/2009 | Liskov et al. |
| 7,636,776 | B2 | 12/2009 | Shah et al. |
| 7,657,769 | B2 * | 2/2010 | Marcy et al. .................. 713/375 |
| 7,680,834 | B1 | 3/2010 | Sim-Tang |
| 7,728,823 | B2 | 6/2010 | Lyon et al. |
| 7,730,026 | B2 | 6/2010 | Serlet |
| 7,760,767 | B2 | 7/2010 | Nilo et al. |
| 7,769,717 | B2 | 8/2010 | Federwisch et al. |
| 7,778,963 | B2 | 8/2010 | Novik |
| 7,809,682 | B2 | 10/2010 | Paterson et al. |
| 7,814,231 | B2 | 10/2010 | Paterson et al. |
| 7,860,826 | B2 | 12/2010 | Freedman et al. |
| 7,917,471 | B2 | 3/2011 | Balandin |
| 2002/0049764 | A1 | 4/2002 | Boothby et al. |
| 2002/0133508 | A1 | 9/2002 | LaRue et al. |
| 2003/0093431 | A1 | 5/2003 | Cooke et al. |
| 2003/0131004 | A1 | 7/2003 | Krishna et al. |
| 2004/0193952 | A1 | 9/2004 | Narayanan et al. |
| 2004/0214926 | A1 | 10/2004 | Bittner |
| 2005/0223117 | A1 | 10/2005 | Terry et al. |
| 2006/0031587 | A1 | 2/2006 | Paterson et al. |
| 2006/0041603 | A1 | 2/2006 | Paterson et al. |
| 2006/0066588 | A1 | 3/2006 | Lyon et al. |
| 2006/0069809 | A1 | 3/2006 | Serlet |
| 2006/0288053 | A1 | 12/2006 | Holt et al. |
| 2008/0005195 | A1 | 1/2008 | Li |
| 2008/0034009 | A1 | 2/2008 | Freedman et al. |
| 2008/0165807 | A1 | 7/2008 | Nilo et al. |
| 2008/0168183 | A1 | 7/2008 | Marcy et al. |

FOREIGN PATENT DOCUMENTS

| | | |
|---|---|---|
| EP | 0 339 221 A2 | 11/1989 |
| EP | 0 341 037 A2 | 11/1989 |
| EP | 0 501 160 A2 | 9/1992 |
| EP | 0 566 966 A2 | 10/1993 |
| EP | 0 278 313 B1 | 8/1994 |
| EP | 0 679 028 A2 | 10/1995 |
| EP | 0 238 158 B1 | 12/1995 |
| EP | 0 694 879 A2 | 1/1996 |
| EP | 0 840 242 A2 | 10/1996 |
| EP | 1 246 061 A2 | 10/2002 |
| EP | 1 383 080 A1 | 1/2004 |
| GB | 2 218 833 A | 11/1989 |
| JP | 2000/122907 | 4/2000 |
| JP | 2000/299698 | 10/2000 |
| JP | 2003-330827 | 11/2003 |
| JP | 2004/86800 | 3/2004 |
| JP | 2005-507130 | 3/2005 |
| WO | 93/08529 A1 | 4/1993 |
| WO | 98/20419 A1 | 5/1998 |
| WO | WO 98/45815 A1 | 10/1998 |
| WO | 99/13403 A1 | 3/1999 |
| WO | 99/63441 A1 | 12/1999 |
| WO | WO 01/06364 A2 | 1/2001 |
| WO | 03/036541 | 5/2003 |
| WO | WO 2005/112388 A1 | 11/2005 |

OTHER PUBLICATIONS

Demers et al.; "Epidemic Algorithms for Replicated Database Maintenance;" Xerox Palo Alto Research Center; (c) 1987.

Patent Cooperation Treaty International Search Report received in International Application No. PCT/US2005/022930 mailed Oct. 27, 2005.

Babaoğlu et al.; "Consistent Global States of Distributed Systems: Fundamental Concepts and Mechanisms;" Technical Report UBLCS-93-1; Jan. 1993; Laboratory for Computer Science University of Bologna.

Benford, "Dynamic Definition of Entries and Attributes in the Directory Service," IEEE 1988.

Chang et al., "Extended K-d Tree Database Organization: A Dynamic Multiattribute Clustering Method," IEEE Transactions on Software Engineering, vol. SE-7, No. 3, May 1981.

Chen et al., "A Performance Evaluation of RAID Architectures," IEEE Transactions on Computers, vol. 45. No. 10, Oct. 1996.

Chen et al., "Schemes for Snapshot Advancement for Multiversion Concurrency Control," IBM TDB May 1992.

Coley, "Support of a Dynamically managed Device Switch Table on a Unix Operating System," IBM TDB May 1992.

Com, "Dynamic Memory Estimation for Database Monitor Snapshot," IBM TDB Mar. 1993.

Condry et al., "The Object-Oriented Advantage in Prototyping a Remote File System," In Proceedings Second International Workshop on Object-Orientation in Operating Systems, pp. 190-199, Paris, France, Sep. 1992.

Cruz et al., "DUNES: A Performance-Oriented System Support Environment for Dependency Maintenance in Workstation Networks," IEEE 1999.

Duvall et al., "Database Server Journal Backup Automation Technique," IBM TDB Feb. 1993.

Emma et al., "Exclusive Use Directory and Inode Caching," IBM TDB Dec. 1989.

Gait, "Stability, Avaliability, and Response in network File service," IEEE Transactions on software Engineering, vol. 17, No. 2, Feb. 1991.

Greene, "Indicating the 'File Types' in the Files window of a User-Interactive Display System," IBM TDB Nov. 1986.

Helary et at, "Computing Particular Snapshots in Distributed Systems," IBM TDB Mar. 1988.

Henson, "Managing Executing Files in a Virtual file System," IBM TDB Mar. 1988.

Heyrman et al., "Storage management Mechanism for Managing Snapshot Pages," IBM TDB Sep. 1992.

Honishi et al., "An Index Structure for Parallel Database Processing," IEEE 1992.

Hsieh et al., "Performance Evaluation of Software RAID vs. Hardware RAID for Parallel Virtual File System," Proceedings in Parallel and Distributed Systems 2002.

Hua et al., Improving RAID Performance Using a Multibuffer Technique, Proceedings 15th International Conference on Data Engineering.

Hwang et al., "Reliable Cluster computing with a New Checkpoint RAID-Xarchitecture," Proceedings of Heterogenous Computing Workshop, 2000.

Hwang et al., "Orthogonal Striping and Morroring in a Distributed RAID for I/O-Centric Cluster Computing," IEEE Transactions on Parallel and Distributed Systems, vol. 13, No. 1, Jan. 2002.

Jin et al., "Improving Partial Stripe Write Performance in RAID Level 5," IEEE 1998.

Jonge et al., "Concurrent Access to B-trees," IEEE 1990.

Kashyap et al., "Analysis of the Multiple-Attribute-Tree Data-Base Organization," IEEE Transactions on Software Engineering, vol. SE-3, No. 6, Nov. 1977.

Kumar, "Coping with Conflicts in a Optimistically Replicated File System," Proceedings on the Management of Replicated Data 1990.

Mogi et al., "Dynamic Parity Stripe Reorganizations for RAIDs Disk Arrays," IEEE 1994.

Park et al., "Striping in Disk Array RM2 Enabling the Tolerance of Double Disk Failures," IEEE 1996.

Pilarski et al., "Checkpointing for Distributed Databases: Starting From the Basics," IEEE Transactions on the Parallel and Distributed Systems, vol. 3, No. 5, Sep. 1992.

Santry, "Elephant: the File System That Never Forgets," Proceedings of the Seventh Workshop on Hot Topics in Operating Systems, 1999.

Sechrest et al., "Blending Hierarchical and Attribute-Based File Naming," IEEE 1992.

Venkatesan, "Message-Optimal Incremental Snapshots," IEEE 1989.

Watanabe et al., "Eliminate Information Inconsistency for X.500 Directory," IEEE 1994.

Yang et al., "Global Snapshots for Distributed Debugging," IEEE 1992.

Holt, "Apparatus and Method for Peer-to-Peer N-Way Synchronization in a Decentralized Environment." U.S. Appl. No. 11/157,647, filed Jun. 21, 2005.

* cited by examiner

| Step | Activity | Data | A Status | B Status | C Status |
|---|---|---|---|---|---|
| 0 | None | 0 | 0 | 0 | 0 |
| 1 | User Creates B | Blue | 0 | 1-User creates data item blue on B | 0 |
| 2 | User Edits B | Bluegreen | 0 | 2-User edits data item Blue to Bluegreen on B (bluegreen) | 0 |
| 3 | B and C Sync | Bluegreen | 0 | 2 (bluegreen) | 1-User creates data item blue on B<br>2-User edits data item Blue to Bluegreen on B (bluegreen) |
| 4 | User Edits C | Red | 0 | 2 (bluegreen) | 3-User edits data item on C (red) |
| 5 | A and C Sync | Red | 1-User creates data item blue on B<br>2-User edits data item on B<br>3-User edits data item on C (red) | 2 (bluegreen) | 3 (red) |

*FIG. 6*

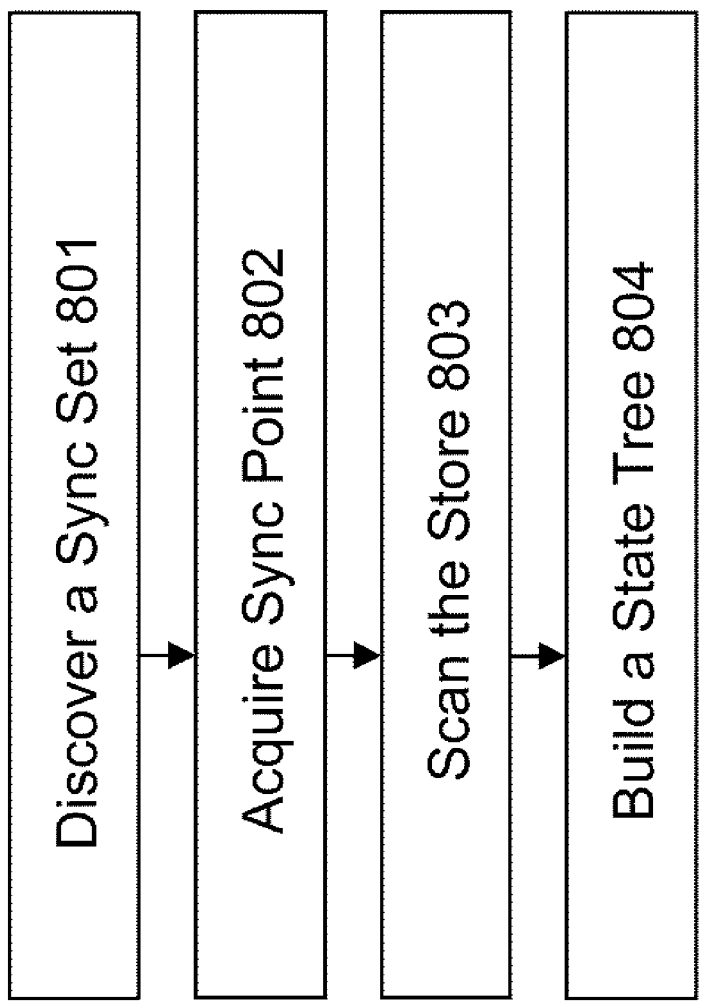

| Col 1010 | Col 1011 | Col 1012 | Col 1013 | |
|---|---|---|---|---|
| Action | A state tree | B state tree | C state tree | |
| Sync A with B | A(1)<br>A1 | B(1)<br>A1 | C(0) | Row 1021 |
| Modify B | A(1)<br>A1 | B(1)<br>A1* (* denotes modification, clock/count only increments at sync time) | C(0) | Row 1022 |
| Sync B with C | A(1)<br>A1 | B(2)<br>A1B2 | C(1)<br>A1B2 | Row 1023 |
| Modify C | A(1)<br>A1 | B(2)<br>A1B2 | C(1)<br>A1B2* | Row 1024 |
| Sync C with A | A(2)<br>A1B2C2 | B(2)<br>A1B2 | C(2)<br>A1B2C2 | Row 1025 |
| Modify A | A(2)<br>A1B2C2* | B(2)<br>A1B2 | C(2)<br>A1B2C2 | Row 1026 |
| Sync A with B | A(3)<br>A3B2C2 | B(3)<br>A3B2C2 | C(2)<br>A1B2C2 | Row 1027 |

Figure 10

| | Col 1111 | Col 1112 | Col 1113 | |
|---|---|---|---|---|
| Action | A state tree | B state tree | C state tree | |
| Sync A with B | A(1)<br>A1 | B(1)<br>A1 | C(0) | Row 1121 |
| Modify B | A(1)<br>A1 | B(1)<br>A1* | C(0) | Row 1122 |
| Modify A | A(1)<br>A1* | B(1)<br>A1* | C(0) | Row 1123 |
| Sync B and C | A(1)<br>A1* | B(2)<br>A1B2 | C(0)<br>A1B2 | Row 1124 |
| Sync A and B<br>DECLARE CONFLICT | A(2)<br>A1* | B(2)<br>A1B2 | C(0)<br>A1B2 | Row 1125 |
| CONFLICT<br>RESOLVED IN A'S<br>FAVOR | A(2)<br>A2[A1B2] | B(3)<br>A2[A1B2] | C(1)<br>A1B2 | Row 1126 |
| Sync A with C<br>USE LOSER VECTOR | A(2)<br>A2[A1B2] | B(3)<br>A2[A1B2] | C(1)<br>A2[A1B2] | Row 1127 |

Figure 11

N-WAY SYNCHRONIZATION OF DATA

RELATED APPLICATIONS

This Application is a continuation of U.S. patent application Ser. No. 11/621,033, filed 8 Jan. 2007, entitled "N-Way Synchronization of Data," and which is incorporated by reference herein in its entirety.

BACKGROUND

Synchronization is a function that provides or maintains consistency between data sets. For example, a desktop computer may have desktop data sets regarding personal information management ("PIM"). A user of that desktop computer may desire to use that PIM data when she is away from her desktop computer. Therefore, she may desire access to the PIM data while using a laptop computer or a personal digital assistant ("PDA") such as a phone or other device like a miniature device. In order to accommodate that desire, her laptop computer and PDA may each carry PIM data sets that correspond to the PIM data sets on the desktop computer. The role of the synchronization function is to give the user a common view of her data on each device. This role is generally accomplished by synchronization events when two or more of the devices synchronize.

A common technique for synchronizing devices is by using snapshots of data at a point in time and comparing current data to the snapshot to determine what has changed. For illustration purposes, refer to FIG. 1 where there is shown a model for two devices, a desktop computer 100 and a portable computer 110. Desktop computer has PIM database 101, which keeps current information for PIM data sets that are edited or added on the desktop computer 100. Desktop computer 100 also has snapshot database 102 that is a temporal snapshot of the state of the data (e.g., a snapshot of the data sets taken at some point in time but typically the time of a prior synchronization—perhaps, the most recent synchronization). Similarly, portable computer 110 has portable database 111 for current data (and, like any syncing peer such as portable 110 or PDA 120, may also have a snapshot database). Having these structures in place, we may attempt to synchronize desktop 100 and portable 110. Typical synchronization occurs by comparing both portable database 111 and desktop database 101 with snapshot database 102. During the compare operation, we can then assemble a list of data items that are new or changed in the active databases 101 and 111 as compared to database 102. Finally, to finish out the synchronization, the list of new and changed data may be used to update all three databases 101, 102 and 111.

A problem occurs in the described synchronization process when corresponding data is changed on both the desktop and the portable. For example, suppose that sometime prior to synchronization, Jane Doe's phone number was changed to 877-555-5555 on the Desktop and 800-555-5555 on the portable. During the compare operation (or at another time) the synchronizing system will notice this discrepancy and identify a conflict. In the current commercial art, there is generally no elegant way to resolve this conflict with certainty. Some solutions present an interface to the user and ask her to choose between the two options. Unfortunately, even the user may not remember which piece of data is correct. Other commercial solutions simply create duplicate entries in each database (one with each of the possible data items).

The problem is exacerbated if there are more than two devices carrying the corresponding data sets. For example, referring to FIG. 1, assume that after synchronizing with portable 110, desktop 100 attempts to synchronize with PDA 120. During synchronization, we may discover that PDA 120 carries Jane Doe's phone number as 888-555-555. Unfortunately, in the prior art, we once again have no elegant solution for determining the correct result with certainty. Furthermore, even if we could determine the correct result at this time (e.g. by the user, who remembers), we may be unable to stop the system from having the same problem again the next time portable 110 is synchronized.

Finally, the problem may be generalized for peer-to-peer systems with 3 or more peers. That generalization is that, if peers may synchronize with each other 2 at a time, and a conflict arises there is no way to know if one of the peers carries a more up-to-date data. It is noteworthy, that a time stamp can not resolve the conflict with certainty. This is because as a matter of practical human usage, if two corresponding data items have been changed over the past days or months, that doesn't necessarily mean that the second change is correct. This is especially true if the second change occurred as the result of synchronization with another peer (such "another peer" may have received its data change long ago). Therefore, in the peer-to-peer situation, we would be unable to determine if a detected conflict is, on the one hand, a true conflict, or on the other hand, an apparent conflict that could be correctly resolved (e.g. per user intent) if we understood the history of the data.

Some of the related prior art techniques for synchronization may be found in the following U.S. Pat. No. 5,710,922 "Method for synchronizing and archiving information between computer systems," which is incorporated herein by reference. In addition, the following pending patent applications offer similarly interesting information and are hereby incorporated by reference: "A Method of Synchronizing Between Three or More Devices" by Toby Paterson and Jerome Lebel, having application Ser. No. 10/853,306 and filed May 24, 2004; "A Method of Synchronizing" by Toby Patterson and Jerome Lebel, having application Ser. No. 10/852,926 and filed May 24, 2004; and "Apparatus And Method For Peer-To-Peer N-Way Synchronization In A Decentralized Environment," having application Ser. No. 11/157,647 and filed Jun. 21, 2005.

In view of the discussion herein as well as the other problems existing in the prior art, certain embodiments of the invention propose a synchronization system that employs datum history information in a process to provide synchronization services either as an API layer in an operating system or as directly employed by software and systems requiring synchronization.

SUMMARY

The embodiments described herein relate to the use of history information as an aid to synchronization in a peer-to-peer system. In some embodiments, there is a group of syncing peers. Each peer in the group has a designated sync point in its storage area. Each sync point indicates a hierarchy in the file system and the group of sync points correspond to each other in that they indicate storage areas that are kept in synchronization with each other.

In some embodiments of the invention, the file system hierarchy indicated by the sync point is scanned to acquire metadata regarding all the objects in the hierarchy. The metadata is organized in a node tree that mimics the hierarchy of the sync point of each peer. In particular, each node in the tree corresponds to an object in the file system. In some embodiments, the nodes may be data structures that comprise a great deal of information about the object and the history of the object in terms of adds, deletes and modifications. In some embodiments, one special kind of history metadata retained is information regarding prior conflict resolutions regarding the node.

Some embodiments of the invention employ a data structure called a version vector. A version vector indicates synchronization metadata for each node in the node trees. A software engine is used to compare corresponding nodes of the syncing group of node trees. As the comparison takes place, the engine may generate job lists for the peers corresponding to the node trees under comparison. The job lists comprise instructions indicating actions (such as adds, deletes and modifications) for each peer to become synchronized with the others.

Some embodiments of the invention provide other synchronization and user interface techniques. In particular, there is discussion and teaching regarding peer discovery, synchronization infrastructure building, and multi-touch user interface

BRIEF DESCRIPTION OF THE DRAWINGS

FIG. 6 is a history data example chart.
FIG. 8a is a process flow chart.
FIG. 10 is an example shown in a chart.
FIG. 11 is an example shown in a chart.

DETAILED DESCRIPTION

I. Sample Hardware and Software Structures

Figure 1:
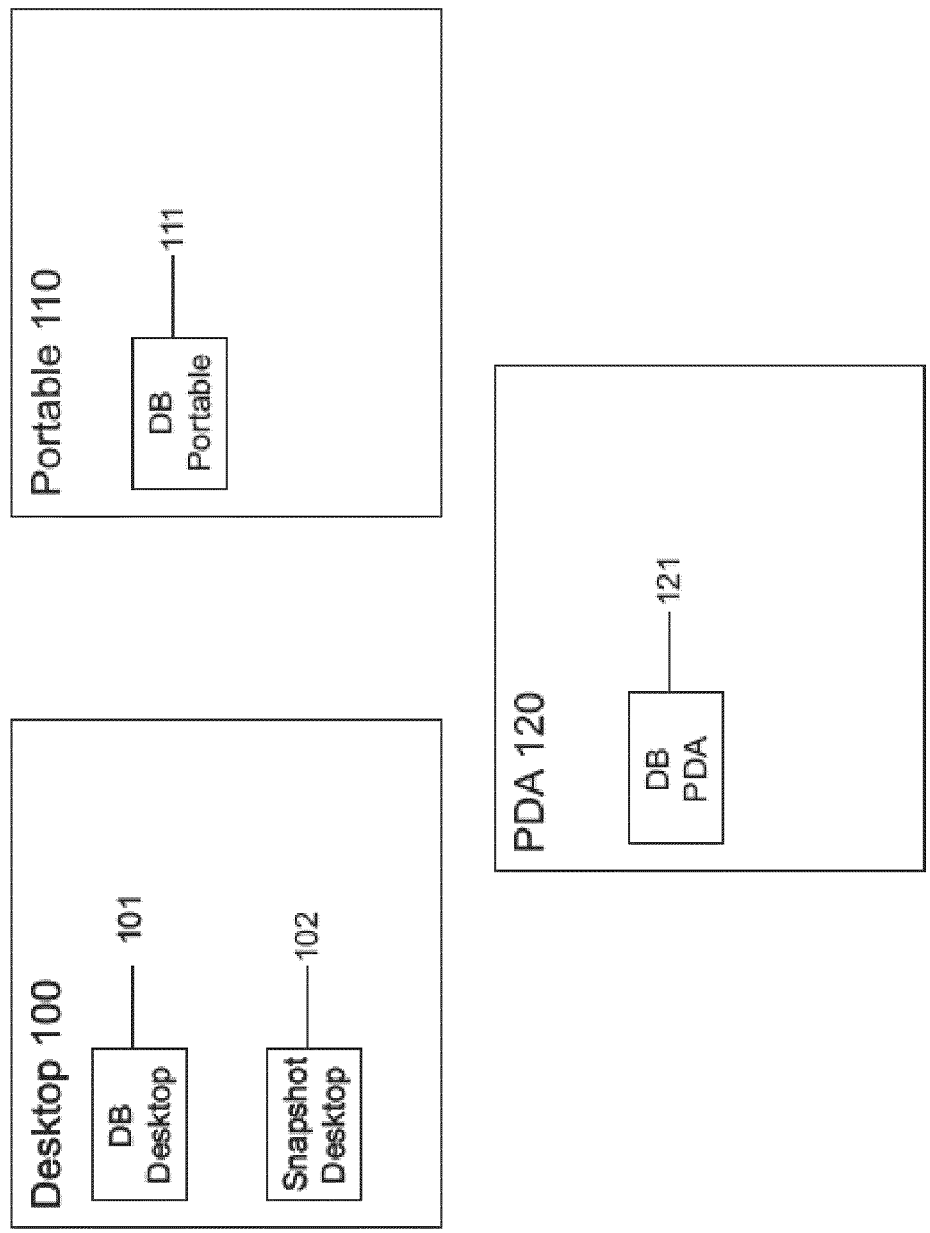
FIG. 1 shows devices that may synchronize.
Figure 2:
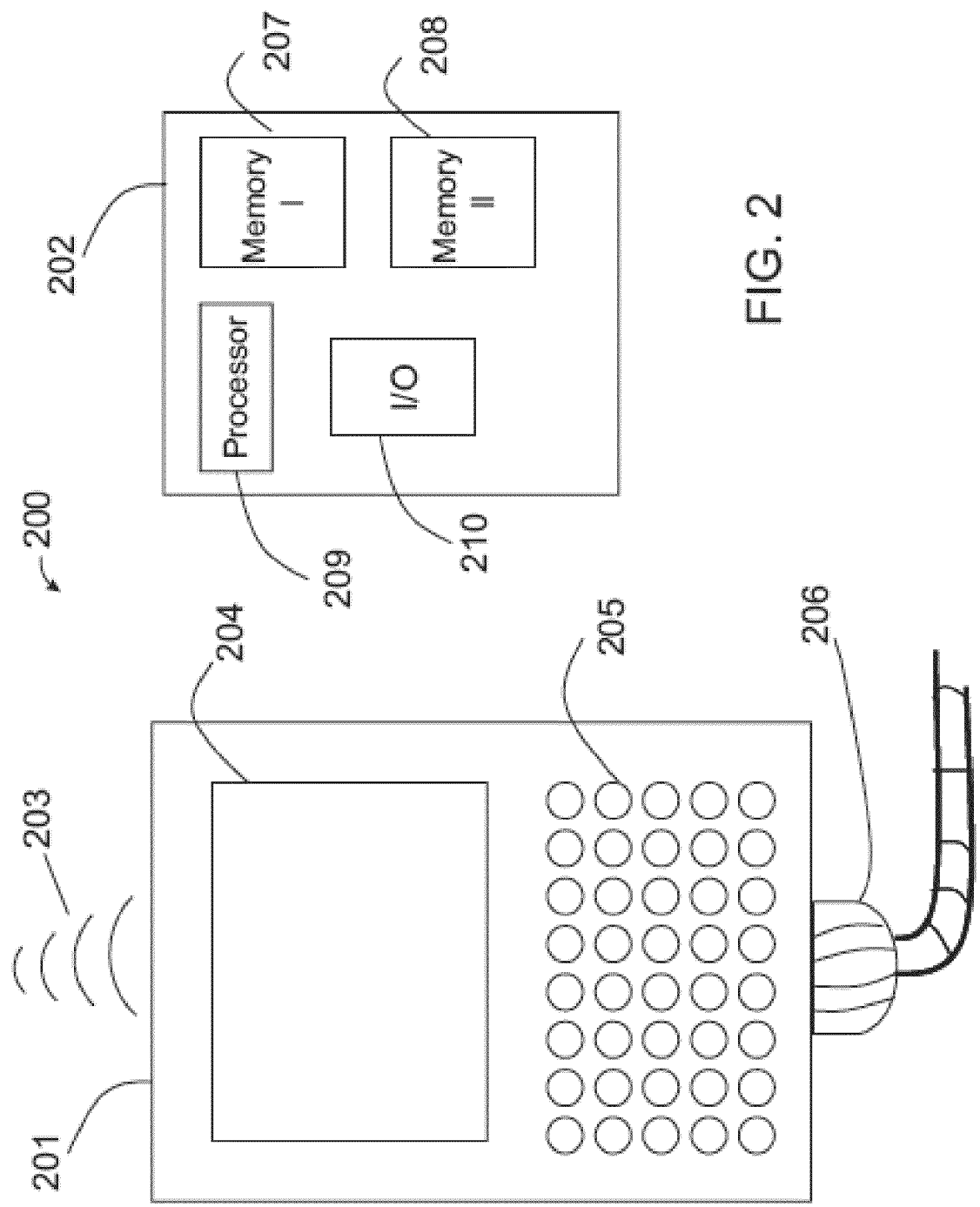
FIG. 2 is exemplary hardware.

While the techniques described herein may be embodied in virtually any structural context, we shall describe some example structural embodiments for illustrative purposes. Referring to FIG. 2, there is shown a sample portable device such as a PDA or telephone handset. The invention contemplates that a peer or client device may be embodied in any item with sufficient intelligence to either (i) serve to allow users to access or edit data, or (ii) to serve as an intelligent repository. Therefore, the device of FIG. 2 is intended to illustrate, without limitation, a sample of one such device. Front view 201 of device 200 shows screen 204 that may be used for viewing or accessing data as well as inputting data (in the case of a touch-sensitive or otherwise input-equipped screen). Keypad 205 may also be used for data input such as by alpha-numerics or otherwise and wired connection 206 may be used for power and/or data transport. Wireless port 203 may be infrared, Bluetooth, 802.11 or any other wireless transmission for moving data in and out of device 200. Turning now to inside 202 of device 200, we see that a processor 209 is present for performing processing tasks. The inventive embodiments may incorporate any type of device, so processor 209 may be any type of microprocessor or controller or aggregate of components that perform the function of running software for effecting one or more of the device functions. Device 200 may also have two or more types of memory for storing data and programs as shown by memories 207 and 208. These memories may be of any type such as magnetic memory, optical memory or any of the many types of silicon-based memory such as SRAM and DRAM. Finally, device 200 may have components 210 to support I/O functionality such as that potentially embodied in wired connection 206 and wireless connection 203. In many embodiments the I/O functionality may be adequately equipped or aided to allow processes on the peer to access any manner of conceivable network, including without limitation, WANs, LANs and the Internet.

Figure 3:
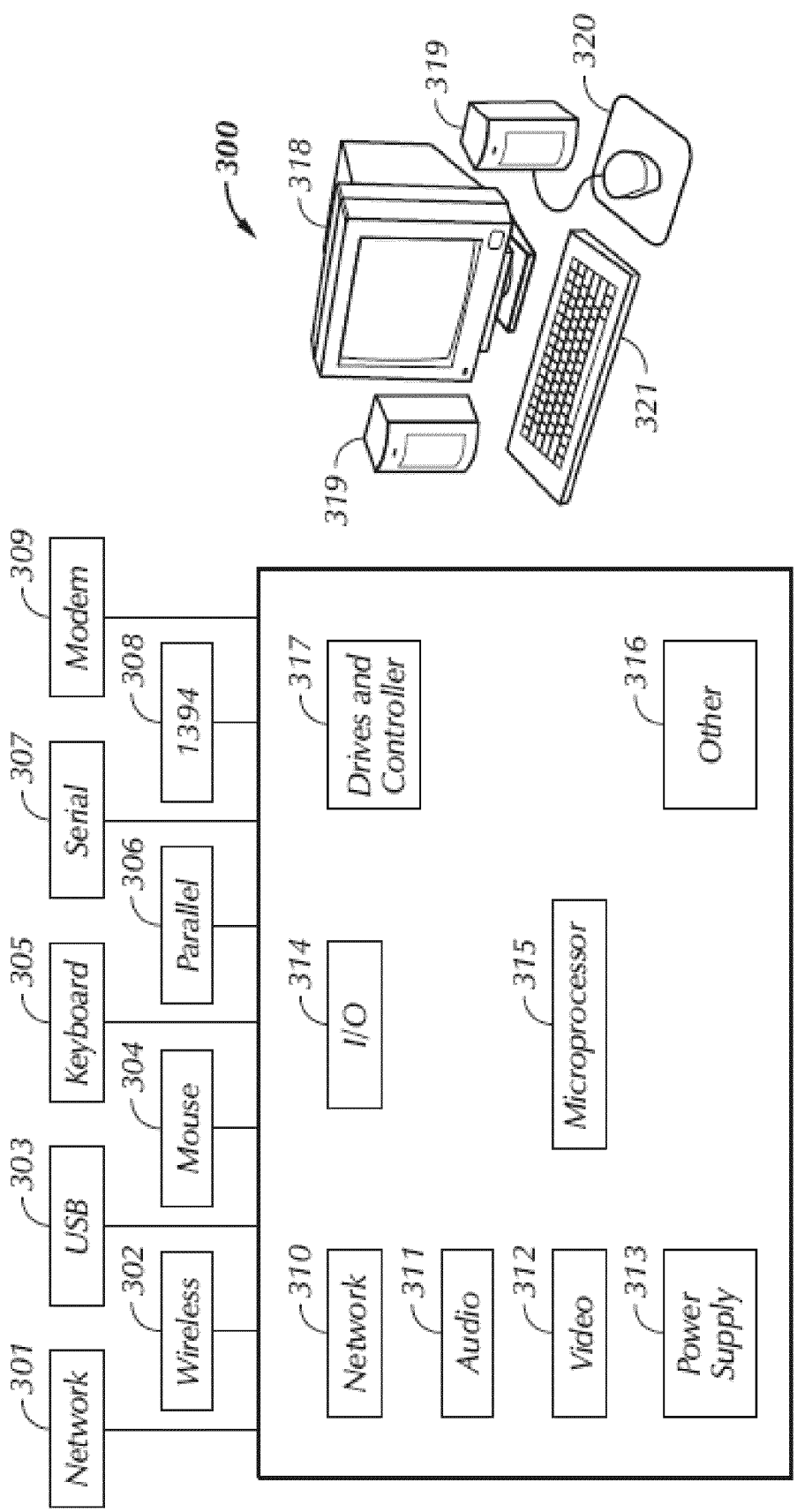
FIG. 3 is exemplary hardware.

Referring now to FIG. 3, computer 300 is another illustration of a device that may act as a peer and certainly provides for a user to use in conjunction with many of the disclosed techniques. Computer 300 is an ordinary computer, like a personal computer, but not intended to be limited as such. Computer 300 has one or more microprocessors 315 and accompanying chipset (not shown) at the heart of the system. The chipset may include items such as network unit 310, audio unit 311 and many I/O functions such as those that might be embodied in I/O unit 314. Of course, any of these functions, or sub-functions, may be implemented individually or collectively within a chipset or outside. Computer 300 also has power supply 313 for adapting and supplying power. Computer 300 may have any variety of optical and magnetic drives and the appropriate controllers to use those drives such as IDE, ATA or SCSI controllers. In the case of a user device, for a purpose of user accessibility, computer 300 may have monitor 318, speakers 319, keyboard 321 and mouse 320 optional tablet/touch screen. Finally, computer 300 may connect with any manner of other items (such as other devices carrying corresponding data items) through various ports (Network 301, wireless 302, USB 303, parallel 306, serial 307, 1394 308 or modem 309). Like all the hardware discussed herein, such connections may occur over LANs, WANs or combinations of networks of any kind, including the Internet.

Transitioning from sample hardware, we shall now discuss general software background. In particular, referring to FIG. 4, there is shown a software stack intended to be illustrative of the software architecture in which some embodiments of the invention will reside. Like our hardware examples, this structure is not intended to be exclusive in any way but rather illustrative. This is especially true for layer-type diagrams, which software developers tend to express in somewhat differing ways. In this case, we express layers starting with the O/S kernel so we have omitted lower level software and firmware. Our notation is generally intended to imply that software elements shown in a layer use resources from the layers below and provide services to layers above. However, in practice, all components of a particular software element may not behave entirely in that manner.

Figure 4:
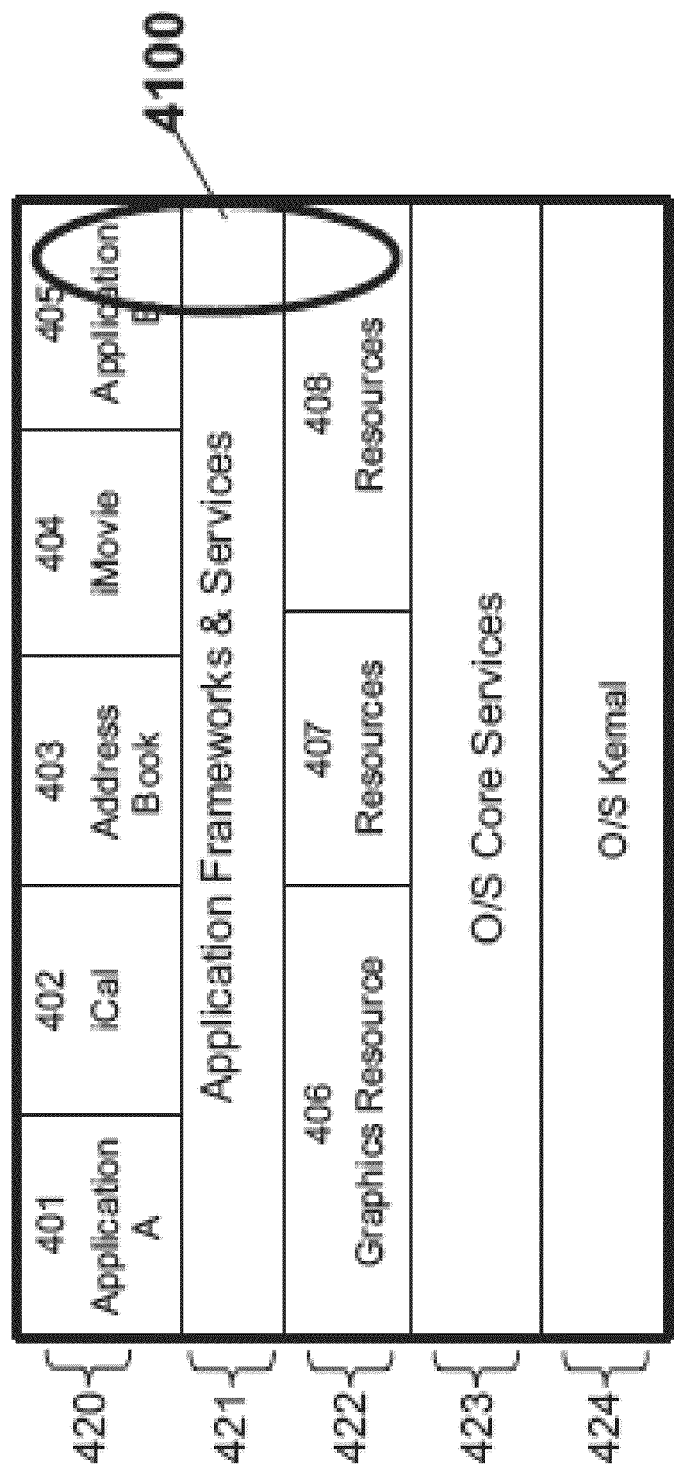
FIG. 4 is an exemplary software stack.

With those caveats, we see in FIG. 4 two layers 424 and 423 dedicated to the operating system kernel and core services respectively. Generally above core services layer 423 there are software layers (422 and 421) for providing higher level resources and services to applications in the application layer 420. Putting the layer diagram in context, we would generally expect to find client type software in the application layer 420. For example, there is iCal application 402 and iMovie application 404 residing in the application layer. iCal 402 and iMovie 404 are application programs that manage or employ data and present a user interface that allows a user to access, edit or manipulate that data. These application layer services are a type of sync client in that a synchronization function provides services to these clients by maintaining a common view (as much as possible) of data among designated clients. Area 4100 shows generally where processes implementing the synchronization function may be located in many embodiments. In more particularity, a process implementing the synchronization function may be a peer to its application clients or may reside in a layer below, possibly even masking itself to the application (referring to a sync client that does not know it is a sync client). The sync function may also have components in two or more layers. In many embodiments, however, the application level sync clients provide a user interface to configure and exploit the synchronization functions, therefore the synchronization processes may appear as an integrated feature in client software. In addition, the synchronization processes typically may present their own user interface for preferences, configuration and control that may be independent of any particular application. Lastly, some embodiments of the invention are intended to offer synchronization services as an API to higher level processes such as application programs. In this context, an application program may use the synchronization API to perform one or more of the following tasks: register to become part of a sync set; find peers to sync with, cause synchronization to occur, set preferences or control parameters; present a user interface to prompt or allow the user to resolve synchronization conflicts or make other choices with respect to the synchronization function; and perform any other task related to synchronization.

II. Vocabulary and Non-Limitation

Throughout this disclosure, we shall use certain vocabulary to discuss synchronization techniques and examples. Most of the illustrations discussed relate to collections of files, where individual files are the datum being synchronized. Generally, we discuss a "datum" as the data or collection of data that is being synchronized and thus treated indivisibly for the purpose of the synchronization function. However, many embodiments of the invention are expressly intended to apply to virtually any kind of data. Some examples of data that may be synchronized using the techniques taught herein are the following: PIM data such as contacts, calendar entries, notes, to-do items, etc.; text files; word processing files; package-type files; files from a file system, media files such as jpegs, mp3, mpeg2, mpeg4, or way files; records from a database; or any other data file type, whether or not associated with a specific applications.

Figure 5B:
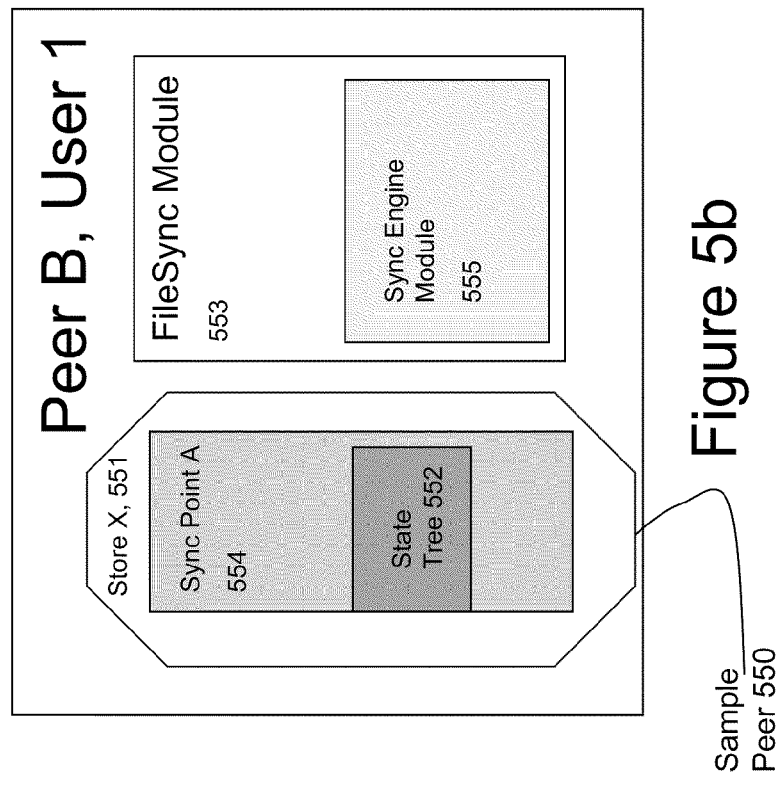
FIG. 5b is an exemplary sync peer.
Figure 5A:
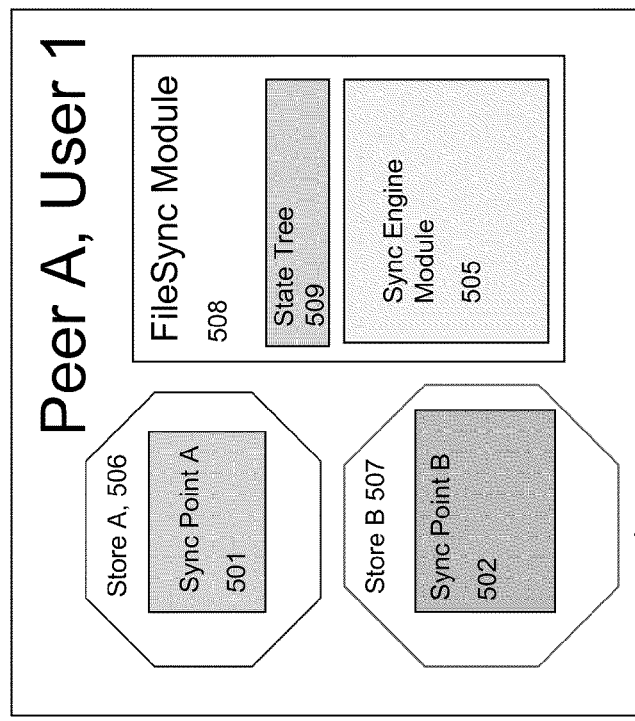
FIG. 5a is an exemplary sync peer.

Retreating then to the language of most of our illustrative embodiments, we shall primarily discuss the invention in terms of "peers" that synchronize with each other or in a group. Referring now to FIG. 5a, there is shown a sample peer device 520 having illustrative software modules and data structures therein. It may first be noticed that sample peer 520 bears the illustrative name "peer A, user 1," which indicates the illustrative metaphor for sync peer. In particular, some embodiments of the invention contemplate a separate "peer" metaphor for each pairing of physical device and user account. Thus, for such embodiments, a single physical computer or hardware device may comprise several peers by virtue of holding several users accounts, and presumably data sets for each user account. Of course, some embodiments of the invention will not have concern with user accounts and, in that event, a peer will refer to the computer or device alone.

Referring again to FIG. 5a, there are shown sync points A 501 and B 502. While a preferred embodiment has only one sync point per peer, for illustration of alternative embodiments, there are two shown here. In concept, sync points represent the data structures for which synchronization is applied. Referring further to FIG. 5a, sync engine module 505 is the software that performs the synchronization function such as identifying synchronization jobs or tasks, performing comparisons, and in some embodiments, providing services to other entities in the system. As seen in FIG. 5a, in some embodiments sync engine 505 is part of larger module responsible for synchronization (file sync module 508). File sync module 508 may comprise a variety of software and may be associated with a variety of data structures. On such potential associated data structure is state tree 509, which is file sync's representation of the state of the files in a designated sync point. In some embodiments, this structure matches a standard file system hierarchy with nodes representing each file and directory. In addition, for embodiments with only one sync point per peer, each sync point has exactly one state tree, regardless of the number of users or computers which sync the peer. Moreover, one or more embodiments place the state tree data structure in the sync point of the associated file system. For example: see FIG. 5b where state tree 552 is shown in sync point A; or see FIG. 5a and interpret state tree 509's placement in filesync module 506 as demonstrating the association between the software and the data structure, which may be stored in store A 508 or elsewhere. In either case, embodiments that place the state tree in the sync point may offer the flexibility of allowing the store to be moved and work with different instantiations of the filesync module (this may be particularly useful if the sync point is on a dumb device like an external drive).

Referring again to FIG. 5a, there are shown store A 506 and store B 507. Analogously, in FIG. 5b, there is shown store X 551. In some embodiments stores are physical places of storage and may be described as an implementation of file system primitives that provide for manipulation of files on any particular platform. In many embodiments (like FIG. 5b), a peer will have only one store, but two are shown in FIG. 5a for illustration of potential alternative embodiments. In one preferred embodiment, a store is implemented as a class hierarchy and the base class uses POSIX file system functions to operate on any mounted file system. Other stores may use specific APIs to perform similar operations on specific types of servers (such as Apple Computer's DotMacKit, which is used to talk to Apple Computer's remote iDisk servers). Typical operations include reading and writing catalog information, reading and writing files, moving and deleting files and directories, and even copying files and directories. Moreover, different file systems support different primitives and available metadata. For example, some common file systems or network equivalents are: HFS; FAT; NTFS; ISO 9660; ODS-5; UDF; SMB; AFP; 9P; FTP; and WebDAV. Furthermore, varying file systems have varying types of metadata readily available. Example metadata items both in the current art and as discussed herein are as follows: attributes; catalog information; store node info, object, name, and object path location.

The topic of synchronization implies multiple peers and indeed, some embodiments are described in term of a "sync set," which is merely a collection of peers that all sync a common group of data such as a hierarchy of files. Of course, a single peer may be a member of a plurality of sync sets simply by having a different common group of data with each set.

Furthermore, many embodiments of the inventions discuss data organization in terms of a hierarchy such as a tree. Referring to FIG. 7a, a tree metaphor is pictured. Leaf nodes of the tree 716, 715, 714 and 713 represent datum, while all other nodes represent containers or are otherwise indicative of organization. One of ordinary skill in the art will recognize that nearly any type of data may be expressed in the tree metaphor. For example, normal computing file systems are expressed from the top node of a root directory thought groups of nested folders all the way down to leaf nodes, which are files or documents. Likewise, a database containing PIM records may be a container; each record may be a subordinate container; and the actual datum (name, number etc.) may be leaf nodes of their respective records (PIM constructs may also be treated as package files).

Figure 7B:
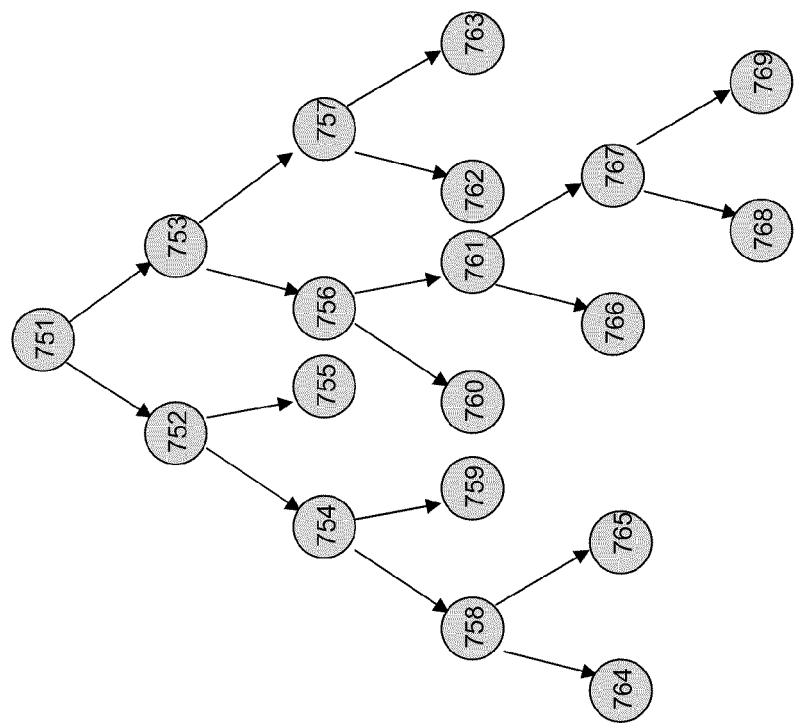
FIG. 7b is a node tree example.
Figure 7A:
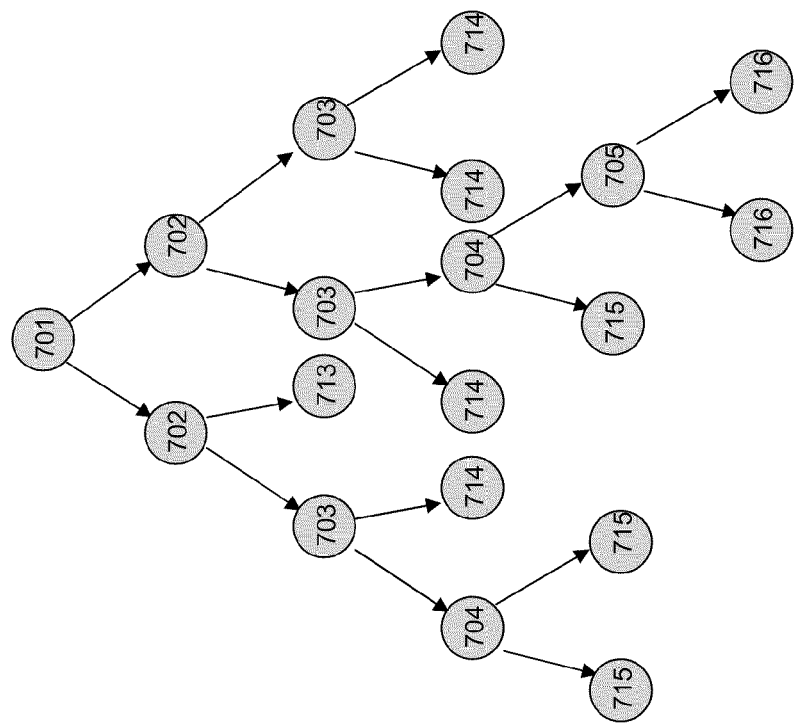
FIG. 7a is a node tree example.

Referring now to FIG. 7b, the sync point of a tree is the top-most point (or root) of the hierarchy being synced. When we refer to the sync point, we are referring to the actual data store or hierarchy of datum/files, which may be expressed as a node tree. Sometimes, we may refer to an associated node tree, which is metadata retained by the sync system in order to evaluate synchronization related issues. An embodiment of such a metadata tree is the state tree discussed later herein.

Thus, in FIG. 7a, if the sync point is node 751, then the entire tree 751 through 769 is the target store structure for synchronization. The sync point, however, needn't be the highest point in any particular hierarchy. For example, if node 756 is the sync point, then the store structure being synchronized is the group of nodes 756, 760, 761, 766, 767, 768 and 769. In some embodiments, there is only one sync point per peer and/or every sync point belongs to one-and-only-one peer.

As suggested above, we may also view the trees of FIGS. 7a and 7b as metadata node trees that corresponds node-for-node with the sync point store structure, i.e. where each node corresponds to an actual file or container in the sync point. With respect to such metadata trees, it should be recognized that varying embodiments provide for the nodes to comprise a variety of information. For example, depending upon the embodiment, nodes may comprise any combination of the following: the name of the file system object it represents; any additional information about that object, such as the kind of object represented (file, directory, package, etc.); the modification history of the object such as whether or not it has been modified since last checked; version vectors for data contents; attributes; and location in the sync point hierarchy.

In addition, with respect to the metadata node trees, some embodiments of the invention employ a special node called a tombstone. A tombstone node is in a state tree to represent history in that spot of the state tree. Unlike other metadata nodes, a tombstone node does not have a directly corresponding object in the file system. Rather, in some embodiments, a tombstone node implies that there was once an object at a designated location in the file system (sync point). In these embodiments, tombstone nodes exist as a way to hold node history in the state tree. This history may be employed to provide synchronization features that are discussed later.

A concept related to the tombstone node is that of node history. A node history is a tag attached to a node in the state tree which tracks the location of old file system objects. In some embodiments, a node history is attached to a node whenever a file system object is moved or deleted. In some embodiments, the node history contains a location version vector for the underlying object at the time of the object was moved, and a reference to the state tree node representing the new location of the object. If the object is moved outside of the sync point or deleted, this reference is undefined (i.e., "nil") and represents a deleted object. This means that in some embodiments, a "delete" operation is just a special case on move, i.e. moved to an undefined space (or nowhere).

III. History Information
a. Using History
When comparing a set of datum to determine the most current, some embodiments of the invention involve the use of history information as part of the assessment. For example, each datum may be associated with a meta-data set that comprises information regarding every change to that datum. The following is a list of some of the information that is desirable to track: the date and time of a datum change; the identity of the local store and/or peer before the datum change; the identity of the store and/or peer after the datum change; the location of the datum in a store at before the datum change; the location of the datum in the store after the datum change; user information regarding the datum change; account information regarding the datum change; the mechanism that cause the datum change (e.g. a user, a sync, etc.); whether a change was the result of a conflict resolution such as a user resolving a conflict; and the history of datums that "lose" (i.e. are updated/modified) by virtue of synchronization with conflict resolution.

b. History in the Form of Version Histories
In some particular embodiments, version histories are maintained for each datum of interest. In practice, there are beneficial uses for maintaining this relatively rich indication of history. For example, in many embodiments of the invention, detailed historical data is maintained. Referring to FIG. 6, there is shown a table that illustrates aspects of synchronizing illustrative peers A, B and C using per-datum history information (although less information than some embodiments may use). In particular, with reference to FIG. 6, the following orientation may be helpful: the first column, labeled "Step" is for illustrative reference so that we may refer to a line of activity without confusion; the second column, labeled "Activity" states an action that causes a datum item change; the third column, labeled "Data" shows the intended datum value from the perspective of the omniscient; the fourth, fifth and sixth columns show the status of the data and history information after each listed activity from the perspective of the respective clients A, B and C.

Referring then to FIG. 6, step 0, we see that the corresponding data items for devices A, B and C are empty and there has been no activity. In fact, this status may represent either an empty data item or the temporal non-existence of the data items. Referring to step 1, a user creates data on device B, the data is "Blue." The facts with respect to the step one transaction are retained on device B. Next, in step 2, the user edits data on device B as indicated. The history is recorded on device B. In step 3, devices B and C are synced, resulting in a synching of the data (blue-green) as well as the history facts for the data item. In the next step (4), the user edits the data item on device C, changing the data to "Red." Now, when devices A and C sync in step 5, the entire history of the data item is conveyed to device A. We see from this example that each device carries all or a portion of the data item history.

Therefore, the history may be exploited to make intelligent decisions about the data. One example of such a decision is, in the situation of an apparent conflict, the devices may determine whether one version of the data item is an ancestor of another. This can be very useful in many cases, such as that of truncated data. Truncated data may occur when a fat device such as a desktop computer synchronizes with a thin device such a phone. If the phone is not capable enough to carry all of a data item (or all of a set such as a record), the data from the desktop computer is truncated for inclusion in the phone database. Later, the phone may synchronize with another device, such as a PDA, and convey the truncated data. If the PDA and desktop attempt to subsequently synchronize, they will encounter a conflict that only specific history data can resolve. Thus, one or more preferred embodiments of the invention call for the maintenance of history information per datum.

Furthermore, if it is not obvious from the discussion above, to be very clear, many embodiments of the invention comprise history information in addition to time stamps because time stamps do not solve some complex synchronization problems. This is true even if all synchronizing machines somehow have perfectly synchronized clocks. For example, suppose a file "cron.log" is created at exactly midnight on both machine A and machine B, which are machines perfectly synchronized with respect to time. If we synchronized A and B using timestamps alone, we may believe that the two cron-.log files are actually the same file (having be independently created, they are not the same file). So even for this trivial example it is clear that other information is useful; namely, in this example, the identity of the machine that made the modification. So, some embodiments will carry the following history information: on machine A, "A @ 00:00," indicating machine A at midnight; on machine B, "B @ 00:00". Now, comparing these ever-so-slightly richer histories will correctly show that the files were different form one and other.

Some embodiments of the invention call for associating datum with a type of history information called version histories. The notion of version histories according to the invention may comprise one or more of several concepts.

First, one point that may be evident from the discussion above is that perfect accuracy and synchronization of heterogeneous system clocks is an unrealistic expectation in the real world. Thus, many embodiments of the invention do not rely on such perfection. Rather, with the aid of other history information, these embodiments only expect that each peer have access to a system clock that is monotonically increasing per each event. For example, the clock could simply increment each time an "event" occurs. Thus, some embodiments may simply use a generation count rather than a clock of any kind Furthermore, a preferred embodiment may use a clock or generation count that never repeats a value (e.g. a full time and date stamp or analogous count).

Next, some embodiments of the invention call for incrementing the clock or generation count for every event. Thus, the count might be incremented for every data modification and perhaps even for related issues like software or hardware failures that have the possibility to impact the status of the data. However, other embodiments employ a more parsimonious incrementing scheme where the clock/count is incremented only once for each synchronization. These embodiments recognize that repetitive increments of the clock/count have little benefit during a period where the data is only accessed locally to the peer. Moreover, a simple dirty bit system may be employed to track the datum that have changed, then prior to synchronization the clock/count may be incremented (in practice of some embodiments, either a count will be incremented or a time stamp applied).

When a plurality of datums are ready for synchronization, one approach to progressing is to compare version histories of corresponding datum to determine whether one datum is an ancestor of another. In making such determination, version history X is an ancestor of version history Y if-and-only-if version history X appears as a prefix in version history Y. For example, {A@7:21, B@8:35} is an ancestor of {A@7:21, B@8:35, C@8:34} "A@7:21, B@8:35" appears as a prefix in "A@7:21, B@8:35, C@8:34" meaning that the latter history incorporates all of the former in addition to something new (by comparison). As another example, {A@7:21, B@8:35} is also an ancestor of {A@7:21, B@8:35, D@8:36} for the same reason. However, when we compare our two descendant version histories, we encounter a different situation: {A@7:21, B@8:35, C@8:34}; {A@7:21, B@8:35, D@8:36}. In comparing these version histories we see that they both have a common ancestor in "A@7:21, B@8:35" but they have each descended differently (C@8:34 and D@8:36 respectively). Thus, in terms of synchronization, there is a conflict situation because the same ancestor was edited in two different places at two different times (in some embodiments, the fact that the times are different does not impact the decision to declare a conflict). The conflict occurs in certain embodiments because we assume the worst, i.e., different modifications were made on peers C and D. After declaring the conflict, in some embodiments, a part of the conflict resolution is to look inside the datum for direct comparison.

To summarize, with respect to version history, if the versions for two datums are the same, then the contents of the datums are guaranteed to be the same; but if the versions are different, the contents of the datums may or may not be the same. To determine if a conflict is a true conflict or a false conflict, a comparison of the datums may be undertaken. Further, it should be noted that in terms of computing, the expense of such a comparison varies depending upon the type of data. For example, comparing phone numbers is magnitudes cheaper than comparing 4MB MP3 files.

c. Slimming Version Histories: Version Vectors

As we have discussed, version histories can be very useful in the synchronization task. However, as discussed so far, this history data may grow forever. Thus we introduce the concept of the version vector for some embodiments where it is preferable to use a slimmer version of history.

One mechanism for slimming version history is to use generation counts rather than time stamps. Thus rather than {A@01,15,2007,7:21, B@01,15,2007,8:35}, we simply use {A@1, B@2}, which provides the same useful meaning that: data originated on A, A syncs with B: B modified data.

Another mechanism for slimming version history is to remove multiple references to activity in the same store. For example {A@1, B@2, C@2, A@3} means: data originates on A: A syncs with B; B modifies; B syncs with C; C modifies; C syncs with A). However, for purposes of some embodiments, it is not important to see the history of the datum having been in store A twice. Rather, for those embodiments, it is only important to know the most recent activity on store A. Thus, we can slim version history by only retaining the most up-to-date (latest generation count) of each store. Applying that concept, the history above may become {B@2, C@2, A@3}. This mechanism is effective because the clock/count of each peer provides constantly ascending counts that do not repeat. Furthermore, in some embodiments, we can even omit the B@2, C@2 elements and then interrogate store A each time a synchronization encounters an A variable such as A@3 (this assumes we require the stores to maintain a more complete history).

Yet another mechanism to slim the histories is to simply remove unnecessary syntax such as the @ sign. Thus, {B@2, C@2, A@3} becomes {B2, C2, A3}. Furthermore, given the positive sequential nature of the clock/count, there is no need to maintain any particular sequence among components of these version vectors (e.g. A3 is always more recent than A1 or A2).

After applying these slimming principles, we can once again visit the matter of comparing vectors. In particular, a version vector X is an ancestor of version history Y if-and-only-if for every store x entry in the X vector, the clock/count value of x entry in the Y vector is greater or equal. For example: {A7, B8} is an ancestor of {A7, B8, C8}, and also of {A7, B8, D8}. Looking closely, however at the latter two vectors, you should notice a conflict because they were the same file when they left B, but then they were modified independently on C and D. For illustration, other examples are as follows:

{A7, B8} is an ancestor of {A9, B8}, and of {A7, B9}.
{A7, B8} conflicts with {A6, B9} because it's older in one dimension (B8 is older than B9), but newer in some other dimension (A7 is newer than A6).

In addition to the foregoing, some embodiments treat nonexistent entries in a version vector as having zero as their local clock/count value. This preserves the correct behavior with respect to comparisons, e.g., {A7, B8} works the same way as {A7, B8, C0}. However, omitting these "0" dimensions permits for peers to join the system at any time without revising any existing version vectors.

Referring now to FIG. 10, a more robust example is provided. The example shows progression of version vectors through several events. The events are shown in column 1010 labeled as "action." Columns 1011 through 1013 show the status of the peers both respect to clock/count (denoted as X(y) on the top line of each row) and version vector status (denoted as X#Y#Z# on the bottom line of each row). The columns are labeled "state tree" to denote that some embodiment carry version vectors as node components in the state tree discussed earlier.

Referring again to FIG. 10, in row 1021 A syncs with B and thus passes vector A1 to B. In row 1022, data is modified at B and while that might be recorded by adjusting the vector, we are supposing an embodiment where a dirty-bit type technique is used and vectors are adjusted at the time of synchronization (recall that this permits several modifications of data between syncs with only a single vector adjustment just prior to synchronization). Thus, in row 1022, we denote the data modification by an "*." Proceeding to row 1023, C and B sync and the vector in B is thus updated to reflect B's modification and clock/count. By virtue of the sync, C holds the same vector. At row 1024, C modifies data, which is denoted by the *. In row 1025, C and A sync thus updating both A's and C's vectors to A1B2C2. In row 1026, A modifies data, which is denoted by the *. Finally in row 1027, A and B sync again. Now the A1 reference is deleted because it has been superseded by A3, thus both A and B carry the vector A3B2C2.

For more information on similar vectors, we refer to the contemporary literature on vector clocks such as: "Distributed Systems: Principles and Paradigms", Andrew Tanenbaum et. al., section 5.2.2; "Vector timestamps"—"Database System Concepts" (3rd ed.), Abraham Silberschatz et. al., section 21.7.4; "Disconnectivity and Consistency"—"Concurrent and Distributed Computing in Java", Vijay Garg, section 7.5 "Vector clocks."

d. Loser Vectors

Some embodiments of the invention employ a concept called loser vectors. In these embodiments, loser vectors are used to preserve information about conflict resolution. In particular, in some embodiments, the loser vector is employed to preserve a user decision regarding conflict resolution. The general idea is to preserve the resolution so that it may be employed without re-expending the effort of conflict resolution again (e.g. asking the user twice about the same conflict). An added benefit of the loser vector is consistency; once a conflict resolution is made there need not be risk that the same conflict is resolved a different way next time (creating even more confusion). Furthermore, the use of loser vectors may be deployed through options or preference settings to provide flexibility.

Of course, the loser vector can be used to preserve any conflict resolution and may be desirable when conflict resolution requires user involvement or some extraordinary or increased effort. For example, if conflict resolution requires detailed comparison of MP3 files, or even worse MPEG2 movies, some embodiments may preserve loser vectors so that the comparison needn't be repeated.

In concept, a version/loser vector is constructed in the style of a header and an argument. The header provides the version vector regarding the datum and the argument provides the identity of the losing vector. For example, we interpret the loser vector A1B2[A1C2] as header A1B2 reflecting the state of the datum and [A1C2] reflecting a potential state of the datum that a conflict resolution process (e.g. ask the user) has eliminated.

Referring now to FIG. 11, there is shown an example of how a loser vector may be created and used. In row 1121, A syncs with B yielding vector A1 for both A and B. In row 1122, B modifies the data as indicated by the asterisk. In row 1123, A modifies data, also as indicated by the asterisk. B and C sync in row 1124, thus each bears the vector A1B2. Next, A and B sync, but a conflict is evident because the stores' appear to hold different modifications of the original A1. For purpose of our example, we assume that the conflict is resolved in A's favor by a user or by some other extraordinary mechanism, so a loser vector is created. In particular, the vector A2[A1B2] indicates that A2 is the correct version vector for the datum and was selected as such over the loser vector A1B2. Thus, in row 1127, when A syncs with C, the system knows to use A2 rather than A1B2; and does so without re-asking a user or re-applying an extraordinary resolution process.

Finally, with respect to certain embodiments employing loser vectors, there are a few edge cases to be considered. First, when two loser/version vectors have equal headers, they may also have different loser vector portions. In this case, some embodiments will merge (and prune, if applicable) the loser vectors and write them back to their respective stores. Thus, in these embodiments, the version for a datum may change even though the datum itself doesn't change.

In some embodiments, you can create a highly unusual case where two versions include each others' header in their loser vector portion (i.e., they are both a loser to the other). For caution, these embodiments should treat this case as a conflict.

In some embodiments, there is another highly unusual case where the user or system tries to add a "loser" to a loser vector that is strictly newer than the header of the version. In these embodiments, there may be several solutions including simply declaring a conflict. In some embodiments, when this case is detected, the headers are merged and incremented. A related question concerns the prescribed course of action when the user elects an older version during a conflict resolution. In this case, some embodiments assign a new version to the older datum thus eliminating the possibility that the older version vector loses in a future sync and thereby overwrites the user's express wishes.

IV. Synchronizing a. Discovering Sync Peers

The inventions herein contemplate that peers (or nodes) in a peer-to-peer syncing system may have several alternative mechanisms and/or processes to discover other peers. As a primary mechanism, users may designate other peers for synchronization grouping. Such user designation may be performed through a user interface (e.g. by forms, menus or by prompting the user) and by indicating the identity of one or more of the following: peers, users, accounts, user groups or associations, account associations, user attributes or criteria, peer attributes or criteria, account attributes or criteria.

As a complement or supplement to peer discovery by user entry, peers may arrange to find each other through a network or conjoined networks. In this respect, there are many known techniques in the art providing for peers to discover each other and embodiments of the invention contemplate use of any of these techniques. For example, varying embodiments may employ Bonjour network discovery or Gnutella-type discovery.

Furthermore, software systems may arrange to search for and retrieve peer IDs or node IDs that meet any specified or suggested criteria. Thus, in some embodiments, peer discovery may be partially or totally automatic via one or more software modules that aid with the discovery process.

One technique for effecting software-aided discovery is to designate one or more software modules for keeping track of information about peers and/or groups of peers. For example, a sync server module or other software module may maintain a table, database or other data structure of information regarding peers or groups of peers. Thus, some peers (or software within those peers) may discover other peers by communicating with the module having the table or database. This module having the table or database may be analogized to an instant messaging server such as AIM or ICQ, which are well known in the art. Further, the well-known techniques applicable to instant messaging servers may be applied to embodiments of the invention.

b. Building the Infrastructure

Referring to FIG. 8a, which is a flow diagram for initialization and infrastructure build of the sync set, we see step 801 is to discover a sync set. Once a sync set is assembled, remaining infrastructure for synchronizing among the set may be constructed. Referring again to FIG. 5a, in some embodiments, each peer 520 in a sync set comprises a filesync module 508 running software to construct the infrastructure. Software associated with the file sync module 508 acquires the sync point information 501, which may be provided in any of several ways: (i) directly or indirectly from a user, for example through a user interface prompt or form; (ii) through an argument or parameter associated with an API call made to the file sync module; or (iii) by any know mechanism for passing information in peer platform. The step of acquiring the sync point is shown in FIG. 8a, item 802.

Once the sync point 501 is ascertained, either in response to an API call or for another reason, software in the file sync module 508 arranges to scan the store 506. In some embodiments, the scan of store 506 yields a data structure comprising every decipherable datum in the sync point's 501 area of the store 501. Having that information, the file sync module may build state tree 509, which may be done in response to an API call. The step of building a state tree is shown in FIG. 8a, step 804. In some embodiments, the state tree is or represents a tree structure of nodes that mimics the portion of the file system designated by the sync point 501. Each node in the tree may comprise a data structure having any or all of the information discussed above with respect to nodes.

According to a preferred embodiment, every peer in the sync set will perform similar operations resulting in a fully constructed state tree for each peer; each state tree associated with a sync point in the peer's store and all the sync points related by common association to the sync set.

c. Initiating Synchronization

Some embodiments employ an initial control flow that may be described through the metaphor of instigator peers and collaborator peers. An instigator peer is such due to its role in instigating syncing activity. Once an instigator fully initiates a sync session, all other peers are collaborators in that session. Through use of file sync software or other appropriate software, a peer may become an instigator peer by initiating syncing activity; leaving the role of collaborator other peers in the sync set. Since some embodiments allow any peer to be an instigator for some sync sessions and/or collaborator for other sync sessions, the controlling software modules for a peer may be configured to embody either role.

Varying embodiments of the invention contemplate appointment of the instigator through various mechanisms. Some basic embodiments involve the following mechanisms for determining an instigator: the instigator may be pre-ordained by programming; the instigator may be determined by collective decision and action of the sync set once and forever; the instigator may be determined by collective decision and action of the sync set some time before every sync event or at intervals between syncing events: the instigator may be appointed by the sync set every time there is a change to group membership; or the instigator may be determined by the designation of one or more users or administrators.

In other embodiments, the instigator may be self-appointed or somewhat self-appointed. In these embodiments, a peer may decide to instigate a sync event for any reason at any time, but without limitation, for any one or more of the following reasons: upon an event related to a sync client such as a PIM function or file addition or modification; upon addition of peers or clients of any type; upon another system event such as start up or shut down; upon an indication of impending component or system failure; upon initiation of a backup power supply; upon user initiation; upon expiration of a timer; upon a set schedule.

In addition to determining the identity of instigators and collaborators, some embodiments comprise notions relating to the timing of sync sessions. In particular, in some embodiments, once an instigator makes a decision to sync, the sync may be initiated either immediately or upon a schedule or timed delay. Some embodiments impose a timed delay so as to employ minimal system resources during the delay. For example, at system start up, a prospective instigator may delay sync initiation for a designated amount of time or until system start up events have quieted. Alternatively, the delay may allow resources for the system to handle whatever event precipitated the desire to perform synchronization. In some of these embodiments the delay will be for a fixed period of time, while in other embodiments the length of delay will change and/or be randomly decided for each event.

In certain embodiments as described, it may be possible for two peers to essentially simultaneously elect to be instigators. Thus, such two peers would essentially simultaneously initiate synchronization between all peers and their synchronization efforts would "collide." In some embodiments, the invention comprises rules and procedures to prevent the "collision" or any simultaneous operation of two instigators. In particular, if a first peer detects a collision (e.g. that another peer is/has initiated a sync), then the detecting peer should discontinue its efforts to initiate a sync. In some embodiments, after discontinuing such efforts, the detecting peer schedules or otherwise arranges to instigate a future sync. The timing of this future sync may be after a random or predetermined delay. A benefit of a random delay is to re-initiate a sync event with a low probability of "colliding" with another instigator again. In addition, varying embodiments of the invention contemplate the use of any of the anti-collision type techniques well-known and used in the networking area.

d. Basic Synchronization

Figures 9A, 9B:
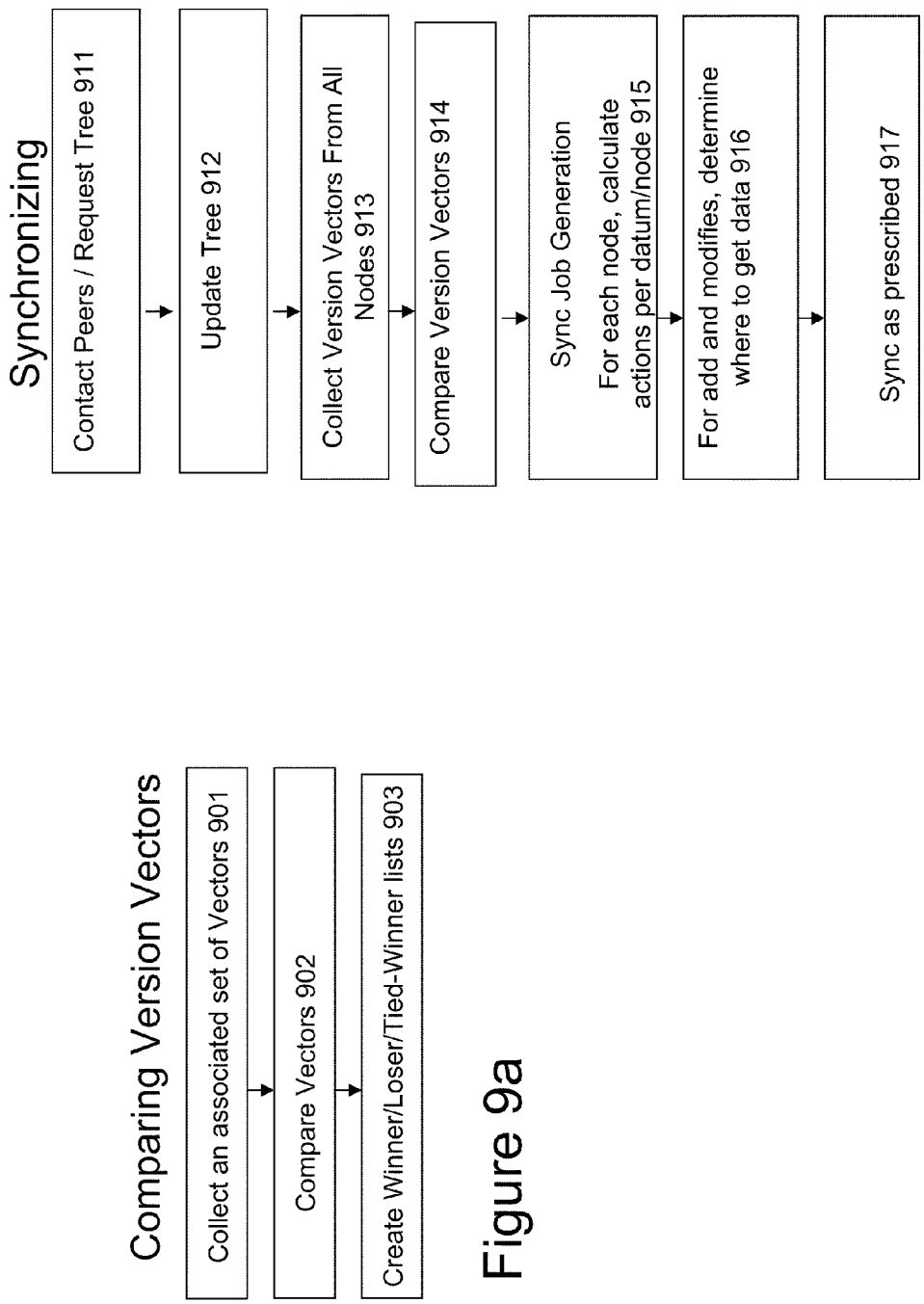
FIG. 9a is a process flow chart.
FIG. 9b is a process flow chart.

In order to begin synchronization, aided by the file sync module, an instigating peer establishes communication with each other (collaborator) peer and requests a copy of their state trees (FIG. 9b, step 911). If the particular embodiment provides for multiple state trees, then the instigator must provide an indication regarding the state tree desired. In some embodiments, in response to a collaborator peer receiving the instigator's request, all the collaborator peers enter a process to update their state trees (FIG. 9b, step 912). In addition, in certain embodiments, the instigator also updates its tree at about the same time. In some embodiments, once the state trees are updated, the collaborator peers forward copies of the state trees to the instigator peer; and the instigator receives and stores the state trees. (FIG. 9b, step 913) . . . In other embodiments, the instigator requests and/or the collaborator peers forward only one node (or a few nodes) of information at a time. These embodiments may save overall bandwidth and computing power, because as we shall explain, if a higher level node (such as a root node) is in-sync, then the lower-level nodes needn't be examined.

Referring to FIG. 9b, the next step in the process is comparing version vectors 914. As a predicate issue, we note that a comparison operation can generally yield three results: the nodes are in sync, there is a clear winner node; or there is a conflict. With that predicate, we can discuss two or three steps of FIG. 9 together. In particular, steps 914 (compare the version vectors) and 915 (prepare job lists) can be discussed together to highlight the potential sequencing options for these steps. In particular, some embodiments job lists may be created during the vector compare operations; for example creating any necessary action items for each set of vectors compared. Other embodiments perform the compare operations yielding results thereof; and then later go through the results to generate job lists for the peers.

Furthermore, this is an appropriate time to note that, for some embodiments, the nature of comparison is for the sync engine to walk corresponding state tree structures. In walking these tree structures, the general process is to begin at the root nodes and compare respective version vectors for the root trees under consideration. If the root node is in sync, then no further action is required on those trees. If the root node is not in sync, then the engine walks down in the tree. We can generalize the tree walk process by stating that if a node other than the root node is under consideration, then a comparison result of "in sync" causes the engine to move up in the tree; and a comparison result of clear winner causes the engine to walk down the tree. In the case of a conflict, the resolution may determine whether to go forward as "in sync" or "clear winner."

In a more particular embodiment, when considering a version vector comparison, if the node is in sync, then no action is required and the process can walk up the tree to find the next node to analyze. If the comparison determines that there is a clear winner, and the node represents datum (as opposed to a container), then the datum should be updated or a job list entry created to do the same. In addition, the version vectors for associated containers (up the tree) should be updated to reflect the synchronization result. If the comparison determines that there is a clear winner, and the node represents a container (as opposed to a datum), then the process walks down the tree to make further node comparisons. As suggested above, the container nodes may be updated when a determination is made with respect to datum or leaf nodes. In particular, in some embodiments the process updates version vectors as it recursively walks up the tree. Of course, other embodiments may chose to update containers as the tree walk progresses. If a node other than the root node is under consideration, then a finding of nodes in sync causes the engine to move up in the tree; and a finding of nodes not-in-sync causes the engine to move down the tree.

Referring again to FIG. 9b, step 916 calls for software in file sync or other modules to determine where to retrieve data for add and modify actions prescribed by the sync engine. Foremost, it should be noticed that this step may also occur simultaneously with steps 914 and 915, and particularly with step 915 (for some embodiments it may occur naturally to tell a peer where to get data at the same time you tell that peer it needs to get data at all). In addition, recall that the vector comparison taking place does not involve any substantive data, but only metadata. Therefore, prescriptions regarding adds and modifies may also require instructions or pointers to the data needed to make an add or modify on the local peer. In general there are a few ways that such data may be supplied: all the data for all peers may be brought to a central location and then pushed to the peers or pulled by the peers; all the data for each peer may be brought to a central location and then pushed to the peer or pulled by the peer; one peer (e.g. the instigator) can determine where each peer can obtain data and provide the instructions or pointers to the peer; or, the peer can simply be given information regarding the necessary changes and it can locate and/or obtain the data itself. Furthermore, there are a great many factors that may be considered in determining the course of action for effecting a job list on a peer: connection between a peer requiring data and peers holding the required data; availability of peers holding required data; speed of peers holding data and peers requiring data; connection or I/O information about any involved peers; location of peer requiring data versus peer holding data; network topography or other factors regarding the network(s) connecting the peers; security issues such as accessibility, trust, encryption and authentication; the type of peer holding or requiring data and/or its hardware or software platform, e.g. MAC, Windows, Server, intelligent or relatively dumb etc.).

Finally, referring to FIG. 9b, each peer must effect the prescribed changes as shown in step 917. In some embodiments, these changes comprise both changes to the substantive datums and changes to the metadata (e.g. the state tree).

i. Updating a State Tree

As discussed above, in some embodiments, as each peer is contacted (e.g. FIG. 9b, step 911) it is asked to begin updating its state tree (e.g. FIG. 9b, step 912) to reflect the current state of its sync point. Generally, updating the state tree may involve scanning the sync point and insuring that all the node parameters in the state tree are accurate and up-to-date. In some embodiments and depending upon the peer's capabilities, the file sync module may be able to update the tree through system services or API calls on the resident platform. For example, Apple Computer's OS X software may allow an implementation as follows.

In OS X, peers may use a change tracking system (such as file system events) to determine which portions of the sync point's hierarchy contain modifications. These changes are used to tag directory nodes in the state tree as "isChildModified" (because FSEvents does not provide file-level change notifications; an implementation of the file sync software only uses change tracking data to indicate which directories have modifications). After the deltas have been processed, an implementation of the file sync software queries the database comprising the state tree nodes (hereinafter "node database") for all the directories with the "modified children" flag set and scans those individually. If no change tracking system is available, or if the change tracking fails or generates results which don't make sense, the peer employs a full scan. Furthermore, before a directory is scanned, all of its existing child nodes are tagged with an "isRemoved" flag. As the contents of the directory are scanned, the name of each object reported by the file system is checked against the existing child nodes of the directory in the state tree. If a node is found with the current object's name, its "isRemoved" flag is cleared and its store node info is updated from the catalog information reported by the file system.

Continuing discussion of the OS X implementation, for each new object discovered a new node is created as a child of the directory node being scanned, and its store node info is set to correspond to the catalog information reported by the file system. These new nodes are also tagged with an "isNew" flag. Note that a new node has undefined (i.e., nil) version vectors until later in sync process. When a node's store node info is updated, it is also potentially given up to three new version vectors. If the node is a file and the contents of its data fork have changed, it receives an updated "contentsVersionVector." If the object's attributes (any metadata synced by an implementation of the file sync software) have changed, it receives an updated "attributesVersionVector." Finally, if the location of the object has changed (see "Move Tracking," below) it receives an updated "locationVersionVector." For directories, the "contentsVersionVector" is updated whenever any child object has been modified in any way (attributes, location, new, or deleted). This applies to any deep children, too, so if a single file is changed deep within the sync point's hierarchy, each parent directory (up to and including the root of the sync point) receives an updated "contentsVersionVector." This lets an implementation of the file sync software quickly determine if it needs to descend down any branch of the state trees when generating sync jobs. Thus, if all peers have the same "contentsVersionVector" for any given directory node, it is guaranteed that all descendent nodes are already in sync.

Still continuing discussion of the OS X implementation, once the file system reports that no more child objects are available for the current directory, any child node with its "isRemoved" flag still set is given a "deleted" node history and converted into a tombstone node. Since tombstone nodes cannot contain children of their own, if the deleted object was a directory the children of the directory are simply deleted from the state tree—only the top-most directory which was deleted will remain in the state tree.

Continuing discussion of the OS X implementation, after each directory with its "isChildModified" flag has been scanned (and the flag cleared), any directory nodes with their "isNew" flag set are scanned as above. This process is repeated until there are no new directories found. Note that the above process is somewhat optimized for scanning the remote iDisk as it supports returning catalog information for up to five levels of hierarchy (iDisk is Apple Computer's virtual disk space or server disk space that is available to computer users anywhere via a connection to the internet). This "deep" scan is used for all new directories, while the "isChildModified" directories are just scanned for their immediate children. If any peer is unable to successfully update its state tree, or if the machine driving the sync loses contact with any peer, it is simply removed from the set of available peers. If this leaves fewer than two available peers, the sync is aborted. Otherwise, the sync proceeds to the "Sync Job Generation" stage.

ii. Move Tracking

In order to facilitate synchronization, some embodiments of the file sync module track file/datum moves (from one place in the store to another). In addition, some embodiments of file sync treat delete operations as moves by indicating that a file or datum is moved to a nil space (moved to nowhere). In general, the engine may find a move by comparing temporally different versions of the same state tree. For example, upon a synchronization event, a peer may update its state tree to current. Assuming that a copy of the pre-updated state tree has been preserved, the updated state tree may be compared to old version. Such comparison will reveal moved nodes. Moreover, in some embodiments, an indication such as a tombstone or a tombstone node may be inserted in the updated tree to preserve the history of the prior node location and any other desirable metadata. For example, the tombstone or tombstone node may record identifying information for the object that previously occupied the space and the location to which it moved.

Apple Computer's OS X software may allow a move tracking implementation as follows for stores which support nodeIDs. In some embodiments, the nodeID is a fixed-length integer number that uniquely names a file/datum throughout its lifetime, regardless of its name or path location within the host file system. This means that even if a file is renamed or moved, its nodeID remains the same. In some of the nodeID embodiments, the nodeID should not be reused when a file is deleted (or, at least, not for a period of time that obviates risk of duplication). In the implementation under discussion, the nodeID of each object reported by the file system is compared to the nodeID last seen for the object (recorded in the node's store node info). If the nodeID has changed, we ask the file system to locate the object with the previous nodeID. If the previous object is found and it exists within the sync point's hierarchy, we record a "move" node history on the old location before updating the node with the information from the current scan. If the previous object is found but is outside the sync point's hierarchy, the old object is given a "deleted" node history before updating the node with the information from the current scan. If the previous object is not found, no node history is added as we assume the new object is just an updated version of the old object. Additionally, at the end of the directory scan, any child node with its "isRemoved" flag still set is first checked by asking the file system to locate the object referred to by the child node's nodeID. If an object is found and it is within the sync point's hierarchy, a "move" node history is added to the child node, which indicates the new location of the object. If necessary, new nodes are added to create the necessary path within the state tree for this new location. If an object is not found for the nodeID, or if the object found is not within the sync point's hierarchy, the node is given a "deleted" node history as before.

iii. Version Vector Comparison

As discussed above, many embodiments call for vector comparison during the synchronization process. Since these embodiments incorporate the notion of simultaneously synchronizing 3 or more peers, we may refer to the associated vector comparison as "N-way" where N represents the number of vectors under consideration.

During an N-way comparison and as indicated in FIG. 9a, step 901, the engine receives a set of version vectors as its input (e.g. each vector represents one node in the state tree of each peer under consideration). As indicated in step 902, the engine then compares the vectors. In a general sense, the comparison examines any relationship among the vectors. Specifically, the comparison may determine which vectors are ancestors of others and which vectors are the same as (or equivalent to) others. Having the benefit of this information, the engine may categories the vectors in one of three categories: "winners"; "losers"; and "tied winners." The result may be express in any type of data structure and in some embodiments it is simply a table or a group of lists.

Losers vectors are those that are direct ancestors of any winner(s) (i.e., strictly older than a winning version). Winner vectors are those that are neither ancestors to any other vector under consideration, nor equivalent to any other winner vector under consideration. Tied winner vectors are simply vectors that equivalent to any winner vector. When we consider together the concepts of winners and tied winners, we can make some illustrative observations. The first observation is that the difference between a winner and its equivalent tied winners may simply be random choice or the sequence in which the engine reached the vector for consideration. Once a vector is declared a winner (by virtue of the programmatic rules), any equivalent vectors found must be tied-winners because they will fail to satisfy one condition of being a winner (i.e. non equivalence to a winner). A second observation is that if two winners are declared after comparison, a conflict is implied. This is because we are comparing vectors that represent corresponding datum from a plurality of peers; for example Jane Doe's phone number. If we examine the vector and determine that it is not an ancestor of any other vector in the set under comparison, then we may declare that vector a winner (we have no other winners yet so the second winner criteria is met). Suppose we then examine a second vector and determine that it is neither equivalent to the winner nor an ancestor of the winner (e.g. it may be relative of the winner that diverged in by virtue an apparently independent modification of the datum). Since the second vector is not equivalent to or an ancestor of the winner vector, we generally must assume that this second vector represents datum different than the first (so we have two different phone numbers for Jane Doe). Thus, the second vector is also declared a winner, and as such, there is a conflict.

This breakdown of versions into winners, losers and tied winners simplifies synchronization analysis because: (i) any n-way version vector comparison which results in more than one "winner" is an indication of a conflict; (ii) a result of one winner and one or more losers indicates a clear winner and the identity of the peers requiring update; (iii) a result of one winner and the remainder of all tied winners indicates that the node is in sync; and (iv) tied winners indicate possible additional sources for the same data so a peer can potentially copy the data from the "best" peer or even from all winning peers. To maintain this simplicity, in many embodiments, the resulting vector from each comparison operation may only be a member of one of the three output sets (winners, losers OR tied winners).

In some embodiments, once the sync engine determines it does not have a conflict at any given node, the winner and tied winners are grouped to provide a comprehensive set of peers which contain the desired data. This set may be employed later to help update peers.

One aspect of the n-way version vector comparison is that, in certain embodiments, undefined (i.e., nil) version vectors are always "winners." This is because a null is not an ancestor of anything nor equal to anything (much the same as NaNs are never equal in floating point comparisons). An undefined version vector implies that the engine does not know anything about the history of the object, which is the case for newly-discovered objects. Since, in these embodiments, undefined version vectors are always winners, the engine will always detect a conflict when there are new objects present unless the only object present is a single new object (i.e. the only winner is the new object because it is the only object). Thus, in many embodiments, when the engine first examines a new state tree, there may be no version vectors (they may all be null); and as such, in these embodiments, a null may be defined as a winner. A process may be employed to detect objects with undefined version vectors and compare the contents of the objects (datum) to see if any are equal. Furthermore, in the case of undefined or null version vectors, they may be given the version vector of any object that is equivalent to the object associated with the null version vector. If all the objects have undefined version vectors, one version vector may be assigned to all objects that are equivalent to one and other.

Later on in the process, some embodiments may employ a conflict resolution process, which may use conflict resolution software code. As an initial effort in conflict resolution, such embodiments may examine the nature of the underlying data (e.g. a container like a directory or folder, or a datum like a file). If the node under examination is a container type, the conflict resolution moves to the next level of the tree and orderly begins examination of the nodes. The process will continue through nodes and levels until a datum type node (such as one representing a file) is found. Once the datum type nodes are found, in some embodiments, the engine may examine and compare any available metadata to attempt to make a determination regarding the relationship of the respective datum (i.e. equivalent or not). If no decision can be made from the metadata, the substantive datum may be examined and compared for a definitive determination on the status of the relationships between corresponding datums. Regardless of whether the relationship is determined with meta or datum comparison, if the datum are equivalent, then the system may automatically update the version vectors and make any other necessary adjustments to the state tree (e.g. to any relevant container nodes). If the datums are not equal, then the conflict must be resolved by some more sophisticated process, such as a user inquiry through a user interface, artificial intelligence or predictive logic.

iv. Sync Job Generation

Referring generally to the process of FIG. 9b, after each peer has updated its state tree (912), in some embodiments, the instigator peer may begin to generate sync jobs for each of the available peers. In terms of sync jobs, there are two general operations that may be prescribed to bring the peers into sync with each other: copy and move (delete is just a special case of move). Moreover, both of these operations, either wholly or as broken down below, may be made available to higher level software through APIs of the file sync module or related software.

As implied above, the general operation of copy and move may be broken down into smaller operations. In particular, some embodiments make use the following job tasks, which may be accomplished through API calls from an application program or high-level software to file sync or other system service software:

ADD—occurs when there is a node in one state tree and no corresponding node in one or more state trees under comparison; thus a datum/file or container/directory should be added to the peers corresponding to the state trees having the missing node(s).

MODIFY—Occurs when the node comparison or conflict resolution yields the desirability to change/update data one or more peers.

MODIFY ATTRIBUTES—Occurs when the node comparison or conflict resolution yields the desirability to change/update a datum's/file's or container's/directory's metadata.

MOVE—Occurs when the node comparison or conflict resolution yields the result that a datum/file or container/directory needs to be moved to a new location; further, since a MOVE comprises a source and a destination, the new location may be nil thus the move effecting a delete.

PACKAGE ADD—Occurs when the node comparison or conflict resolution yields the result that a package-type-file needs to be added to a peer.

PACKAGE MODIFY—Occurs when the node comparison or conflict resolution yields the result that a package-type-file needs to be updated for a peer.

Additionally, in some embodiments, there are two "meta jobs" that the engine may generate:

UPDATE VERSION—Occurs when the node comparison or conflict resolution yields the result that version vector(s) for a node should be updated.

PACKAGE CHILD UNCHANGED—Occurs when the node comparison or conflict resolution yields the result that a file or object within a package did not change (this last job may provide for a performance improvement when updating package-type files).

In some embodiments, job generation may be divided into two passes of the engine through the metadata; the first pass for moves (and thus deletes); and a second pass for all other sync jobs. In these embodiments, moves are generated first because it is possible for a file to be both moved and modified in the same sync. It is also possible for a file to be moved and then for a new file to take its original place (e.g. a rolled log files). To properly handle the moved-and-modified case, some embodiments should first generate a move job (and track that pending move so that subsequent checks for the other job types target the correct destination). The program logic for determining which directories need to be checked for sync jobs is the same for both passes, although the actual program logic to determine job generation is obviously different.

The following details describe an implementation for Apple Computer's OS X software, and are intended as illustrative for this disclosure and are expressly not intended to be limiting in any way. Each of the two job generation passes starts by creating a work-set of directories to be checked and initializing that set to contain the root path ("/"). Then the engine repeatedly pulls a path from that set and requests the node at this path from each peer. To determine if it should check the children of this directory it compares the "contentsVersionVector" of these directory nodes from each peer. This is a simple "all or nothing" comparison (if-and-only-if all of the nodes' version vectors compare as equal—so 0 "losers", 1 "winner", n−1 "tied winners"), the directories contain identical objects down to their deepest leaf nodes and can be skipped. Otherwise the children of this node need to be checked for sync jobs.

For illustrative purposes, the following details are provided regarding child job generation in Apple's OS X software. Since it is quite possible for each peer to have children with non-intersecting names, it may be necessary to iterate the child nodes for each peer's directory. To eliminate redundant checks, a list of the child names checked already is used while iterating the children for earlier peers. In pseudo code:

```
checkedChildren = { }
for each peer {
    for each child {
        if (checkedChildren does not contain child name)
            {generateJobsForChild( ) add child name to checkedChildren}}}
```

For each unique child name, the engine first checks to see if all peers' nodes are directories (but not package directories). If all the nodes are directories, the path to this location in the tree is added to the set of directories to be checked (as mentioned above). Then move job generation looks for node histories which might apply to the other peers' nodes. If any are found, a MOVE job is generated and the source and destination paths are remembered for the second job generation pass, where they will be used to remap moved nodes so that subsequent jobs are generated based on the results of the moves.

For the second pass of job generation, all non-MOVE types of jobs are generated. To begin, the engine performs an n-way version vector compare on the "contentsVersionVector" for the peers' nodes. If this compare results in their being more than one "winner" the nodes are declared in conflict. As an implementation detail, the nodes are also always declared in conflict if all the nodes are not of the same type (i.e. file, directory, package), regardless of version vectors. When a conflict arises at this point, an attempt is made to "auto-resolve" the conflict. If the conflict is able to be immediately resolved, the n-way version vector compare output sets are adjusted to reflect the results of the conflict resolution (so "winners" will contain only one object) and job generation continues. If the conflict can not be resolved, the conflicting nodes are noted and added to the list of conflicts to be presented to the user for resolution. The engine may skip generating jobs for conflicting nodes and the sync will proceed. This means that conflicts do not block the sync operation.

As mentioned just above, when a conflict is detected during sync job generation, file sync is first given a chance to resolve the conflict (e.g. through auto resolution). The filesync module may check a few simple rules to decide if it can determine an appropriate winner. In a particular OS X embodiment, the only rule applied to all sync sets is for conflicts on .DS_Store files, and in the case of conflicts on .DS_Store files, the file that is "apparently" newest (e.g. based upon the last-modified date in the catalog information) may be chosen as the winner. Other types of automatic conflict resolution rules may also be implemented, such as Portable Home Directories (PHD). Certain PHD syncs may be given a flag which specifies whether the local or remote object should win in a conflict (to avoid conflicts during login and logout syncs).

For the OS X embodiments under discussion, at this point in job generation, it is guaranteed that there is either a clear winning node or all nodes are equal. Thus, ADD and MODIFY jobs can now be generated. Any peer that did not have an object present at the current location (either no node at all, or a tombstone node) receives an ADD job. These peers are a special case as they are not included in the n-way version vector compare because there is nothing to compare. Any peer which has a node in the "losers" set receives a MODIFY job. When any ADD job is generated, a "pending" node is inserted into the peer's state tree at the location of the ADD. This gives the engine something to work with for subsequent job generation. This also allows the engine to easily determine dependencies on jobs (remember, the state tree may be scanned in an indeterminate order—both because the node database may return objects in an indeterminate order and because the "directories to be scanned" set may return paths to be scanned in an indeterminate order). Sync jobs that require a specific order are flagged as dependent. For example jobs that require certain other jobs be performed first are flagged as depending on those other jobs. In order for such flagging to be useful, a sync job may not be eligible to be performed until all of its dependent jobs have been completed. For example, if we add a directory of files, the directory must first be created on the destination peer before the files can be added. Therefore, the ADD jobs for each file will be dependent on the ADD job for their parent directory.

Note, that in the embodiments under discussion, as jobs are generated, the job records are given an indication of the set of peers that contain the winning object. This may be set simply as the union of the winners and tied winners. When the jobs are sent to their respective peers to be executed, the peer processing the job can examine this set of winning peers and decide from which winning peer to copy the needed data. If there is only one winner, there is no choice, but for n-way syncs it is possible that some peers are on the local LAN while others are on the WAN and therefore more expensive to access. It is also possible for peers to drop out of the sync at any time (most likely due to a dropped connection) so by the time a peer gets around to processing any given job some of the winning peers might not be available at all. By having the full set of winning peers available, the engine can offer syncs that are both faster and more robust.

v. Package Job Generation

Package files are actually bundles of objects that are presented in a file browser as a single file. In some embodiments, a package is a Mac OS X specific concept whereby a directory in the file system can be tagged as a package to denote that it should be treated atomically, like a file. Due to their uniqueness, some embodiments of the invention handle packages as a special case. Specifically, since packages comprise a bundle of object within themselves, some embodiments provide for state trees and/or tree walking to compare the insides of packages. When walking the package insides, the engine may determine the relationship between a set of corresponding packages, for example, whether the packages are equivalent.

The following discussion describes illustrative implementation details of Apple's OS X software. During the second job generation pass, the engine may discover that packages have been added or modified. For these cases, the sync engine may generate special PACKAGE ADD or PACKAGE MODIFY jobs. The normal sync job generation logic is not used because packages should be treated as atomic units. These package jobs allow for "sub-jobs," and the sub jobs are all processed as part of processing the main PACKAGE ADD or PACKAGE MODIFY job. Furthermore, in some embodiments, it is considered unsafe to modify the contents of a package directly because a crash or loss of network connectivity could leave the package in an inconsistent state. Therefore, new packages may be constructed in a temporary directory and then swapped into place once they are complete. Because of this, the sync engine must generate a different set of jobs for the objects inside of packages than it otherwise would for the same objects inside a normal directory. For example, files which have not been modified still need to be copied into the temporary directory; while files which are deleted don't need any job because they won't already exist in the temporary directory. Therefore, there are only three types of sub jobs for packages: ADD, MODIFY, and UNCHANGED.

To allow for optimizing package updating, the job generation for packages will note files in the destination package which are identical to their counterpart in the winning package. This allows the peer to make its own local copy (or even hard-link) these unchanged files, eliminating the need to copy the data across the network. Such unchanged files are represented by PACKAGE CHILD UNCHANGED jobs.

Since the files inside the winning package are always the winning files, there is no need to perform n-way version vector comparisons when generating package sub-jobs. The engine simply compares the version vector for the winning package's file nodes to the node for the losing peer(s). If the version vectors compare as equal, a PACKAGE CHILD UNCHANGED job is generated for that node. If the version vectors are not equal, a MODIFY job is generated. If the losing peer did not have a node at this location, an ADD job is generated.

vi. Sync Job Processing

Regarding the OS X embodiments under illustrative discussion, at the end of the second job generation pass, all the syncing peers may be notified that job generation is complete and they may begin syncing. In these embodiments, it is the responsibility of each peer to perform its own sync jobs. This means that all copying is "pull" rather than "push." For remote peers, the sync jobs are sent to the peer over the network and are processed independently of the jobs for all other peers. The jobs for each peer must be processed in a certain order: for instance, all MOVE (including delete) jobs are performed first, followed by ADDs on directories, ADDs on files and packages, MODIFYs on files and packages, and finally UPDATE VERSIONS. Jobs which are dependent upon other jobs may only be executed once all its dependent jobs have completed successfully. If any sync job fails in its processing, all jobs which depend on that job are cancelled.

Since it is possible that not all remote peers will have the appropriate file sync software running on them, it may be necessary for the machine driving the sync to perform the jobs for these "dumb" remote peers. This means fewer optimizations can be made, although some remote peers may have services available which can compensate.

vii. Temporary Objects

Regarding the OS X embodiments under illustrative discussion, all jobs which are not inherently atomic (everything except moving or deleting a file) use temporary objects. For example, when a file is added or modified, the new data is always copied to a temporary file. When the temporary file is completely updated, it is swapped with the file it is replacing. This is desirable even for ADD jobs where there isn't a file to replace because otherwise there would be a possibility that a partially copied file may be left where only a fully-copied file should exist. When deleting a directory (including a package), the directory is first renamed to a temporary name so that the directory appears to have been deleted in one operation. Then the contents of the directory and the renamed directory itself are deleted. This way, if something should interrupt the delete operation, the engine hasn't left behind a partially deleted directory or a partially deleted package.

In the OS X embodiments under discussion, the engine uses a special format for the names of all temporary objects it creates. A temporary name starts with the prefix ".fstemp." and then appends a unique set of characters to prevent collisions with possible other temporary objects. This prefix starts with a dot (".") so that these temporary objects are normally invisible, and the static prefix lets the sync engine know that such files should never themselves be synced (and in fact should be cleaned up once it is known that such files have been orphaned due to a crash or loss of network connectivity).

viii. Update Version Jobs

In some embodiments, such as the illustrative OS X embodiment under discussion, "update version jobs" are used to update the version vectors on nodes as the sync progresses. For instance, the version vector for a directory may be updated once all the sync jobs for its children have been completed. Thus, we may update the "contentsVersionVector" only after everything below it is in sync so that subsequent syncs will not skip checking this directory's children should the sync be cancelled or fail and children of the directory not be updated. Once all child jobs have completed successfully, the "contentsVersionVector" may be updated to a pre-determined (during sync job generation) version vector. This way, when all peers have a given directory in sync, they will also have equal "contentsVersionVectors." "Update version jobs" are sorted last and depend upon all the child jobs of the directory on which they will operate.

One of ordinary skill in the art will understand that the concepts disclosed herein may be employed in embodiments and technical areas that vary from the disclosed embodiments. Those embodiments are intended only as illustrative and without limitation.

V. NAT Traversal

The description herein makes repetitive mention of networks and connectivity for communication betweens peers, nodes and/or way stations (generally called "nodes" for purposes of this discussion). In practice, these nodes may be deployed either individually or on separate LANs or networks presenting security and credentials problems for traffic between nodes. The inventions herein fully appreciate and contemplate the use of techniques for traversing heterogeneous networks; such techniques being well known in the literature of the current day. Furthermore, with respect to NAT traversal and related areas, this application specifically incorporates by reference the currently pending patent application entitled NAT Traversal For Media Conferencing, by Joe Abuan, Joshua Graessley, Hyeonkuk Jeong and Berkat Tung, assigned to Apple Computer and having the Ser. No. 10/769,841. One of ordinary skill in the art will understand the application of the techniques described therein to the current invention. Thus, the inventions herein fully contemplate the use of NAT traversal techniques and the like for facilitating commutation between nodes in the disclosed systems.

VI. Multi-Touch User Interface

Where the embodiments of this invention call for user interface and user input, the invention contemplates the use of any known manner of such input. However, one manner of input interesting for controlling synchronization or designating synchronization preferences and function is a manner involving touch sensitive systems. Thus, any embodiment of the invention calling for user interaction contemplates the potential use of touch sensing of one or multiple finger signals or gestures. Further, such gestures (whether effected with one or multiple fingers) may be augmented in meaning through the use of fusion concepts where sound or other input mechanisms are interpreted along with such gestures. For purpose of further disclosure of gestures that may be used in connection with disclosed embodiments, reference is made to U.S. patent application Ser. No. 11/232,299, entitled System and Method For Processing Raw Data Of Track Pad Device, filed Sep. 21, 2005 and incorporated by reference herein.

One of ordinary skill in the art will understand that the concepts disclosed herein may be employed in embodiments and technical areas that vary from those disclosed.

What is claimed is:

1. A first peer system for synchronizing data elements in a group of synchronizing peer systems, said first peer system comprising:
   a sync software module for managing synchronization directly with a second peer system;
   a memory for storing a first node tree representing a first sync point in said first peer system and a second node tree representing a second sync point in said second peer system;
   a processor resource for running said sync software module while said sync software module interacts with metadata wherein said running produces a first job list for said first peer and a second job list for said second peer;
      said metadata derived from a set of corresponding nodes, said set of corresponding nodes comprising one node from each of said first node tree and said second node tree;
      said second job list comprising instructions to synchronize objects in said second sync point with corresponding objects in said first sync point and said second sync point;
      said first job list comprising instructions to synchronize objects in said first sync point with corresponding objects in said second sync point and said first sync point; and
   an input/output (i/o) system for connecting with said second peer system for transferring said second job list.

2. The system of claim 1 wherein said metadata comprises a loser vector, said loser vector representing history information of an object in said second sync point, said loser vector preserving the result of a conflict resolution process through an indication of said history information.

3. The system of claim 2 wherein said result of said conflict resolution process comprises a user input.

4. The system of claim 1 wherein each of said nodes in said set of corresponding nodes represents a package-type file, said package-type files corresponding to each other.

5. The system of claim 4 wherein said memory is also for storing a data structure corresponding with each of said package-type files, said data structures each comprising a plurality of indicia, each indicia representing an object in a respective package file.

6. The system of claim 1 wherein said i/o system is capable of communicating with a LAN or a WAN or the Internet.

7. The system of claim 1 wherein said i/o system is capable of communicating with wireless and wired networks.

8. The system of claim 1 wherein said first peer system comprises software that permits for NAT traversal in communicating with said second peer system.

9. The system of claim 1 wherein said sync software module comprises instructions for discovering a new peer system by synchronizing with said second peer system.

10. The system of claim 1 where in said first peer system comprises GUI software for presenting a user interface regarding the discovery of a new peer system.

11. The system of claim 1 wherein said first peer system comprises a software module for using Bonjour to discover a new peer system.

12. The system of claim 1 wherein said first peer system comprises a software module for using Gnutella-type techniques for discovering a new peer system.

13. The system of claim 1 wherein said first peer system comprises a software module for using a directory data structure for performing peer discovery, said directory data structure comprising information regarding said sync system peers.

14. The system of claim 13 wherein said directory data structure comprises information regarding users of peer systems.

15. The system of claim 13 wherein said directory data structure comprises information regarding software or hardware platforms of said peer systems.

16. A method of synchronizing a first peer system with a second peer system, the method comprising the steps of:
   generating a first node tree, said first node tree corresponding to a first sync point existing in a store of said first peer system;
   generating a second node tree, said second node tree corresponding to a second sync point existing in a store of said second peer system;
   storing said node trees in a store of said first peer system;
   analyzing metadata to produce a first job list for said first peer and a second job list for said second peer;
      said metadata derived from a set of corresponding nodes, said set of corresponding nodes comprising one node from each of said first node tree and said second node tree;

said second job list comprising instructions to synchronize objects in said second sync point with corresponding objects in said first sync point and said second sync point;

said first job list comprising instructions to synchronize objects in said first sync point with corresponding objects in said second sync point and said first sync point;

enacting said first job list on said first peer system; and enacting said second job list on said second peer system.

17. The method of claim 16 wherein said metadata comprises a loser vector, said loser vector representing history information of an object in said second sync point, said loser vector preserving the result of a conflict resolution process through an indication of said history information.

18. The method of claim 17 wherein said result of said conflict resolution process comprises a user input.

19. The method of claim 16 wherein each of said nodes in said set of corresponding nodes represents a package-type file, said package-type files corresponding to each other.

20. The method of claim 19 comprising the further step of storing a data structure corresponding with each of said package-type files, said data structures each comprising a plurality of indicia, each indicia representing an object in a respective package file.

21. The method of claim 16 wherein said first peer system transfers said second job list to said second peer system and wherein said first peer system comprises software that permits for NAT traversal in communicating with said second peer system.

22. The method of claim 16 further comprising the step of discovering a new peer system by synchronizing with said second peer system.

23. The method of claim 16 further comprising the step of discovering a new peer system by presenting a user interface regarding the discovery of a new peer system.

24. The method of claim 16 further comprising the step of discovering a new peer system by using Bonjour.

25. The method of claim 16 further comprising the step of discovering a new peer system by using Gnutella-type techniques.

26. The method of claim 16 further comprising the step of discovering a new peer system by using a directory data structure for performing peer discovery, said directory data structure comprising information regarding said sync system peers.

27. The method of claim 26 wherein said directory data structure comprises information regarding users of peer systems.

28. The method of claim 26 wherein said directory data structure comprises information regarding software or hardware platforms of said peer systems.

29. An apparatus for synchronizing datums between a first peer system and a second peer system, said apparatus comprising:

a memory for storing a first node tree representing a first sync point in said first peer system and a second node tree representing a second sync point in said second peer system;

a processor resource for running a client software program, a service software module and a sync software module, said service software module providing a program interface for indicating a sync point, and said sync software module for interacting with metadata and thereby producing a first job list for said first peer system and a second job list for said second peer system;

said metadata derived from a set of corresponding nodes, said set of corresponding nodes comprising one node from each of said first node tree and said second node tree;

said second job list comprising instructions to synchronize objects in said second sync point with corresponding objects in said first sync point and said second sync point;

said first job list comprising instructions to synchronize objects in said first sync point with corresponding objects in said second sync point and said first sync point.

30. The apparatus of claim 29 wherein said metadata comprises a loser vector, said loser vector representing history information of an object in said second sync point, said loser vector preserving the result of a conflict resolution process through an indication of said history information.

31. The apparatus of claim 30 wherein said result of said conflict resolution process comprises a user input.

32. The apparatus of claim 29 wherein each of said nodes in said set of corresponding nodes represents a package-type file, said package-type files corresponding to each other.

33. The apparatus of claim 32 wherein said memory is also for storing a data structure corresponding with each of said package-type files, said data structures each comprising a plurality of indicia, each indicia representing an object in a respective package file.

34. The apparatus of claim 29 wherein said program interface is further for indicating the identity of a new peer.

35. The apparatus of claim 29 wherein said client software program comprises a PIM application program.

36. The apparatus of claim 29 wherein said client software program comprises a media player program.

37. The apparatus of claim 36 wherein said media player program is for playing compressed audio files or compressed video files.

38. The apparatus of claim 29 wherein said client software program comprises an image viewer program.

39. A non-transitory computer readable media encoding program instructions to cause a processing device to:

generate a first node tree, said first node tree corresponding to a first sync point existing in a store of said first peer system;

generate a second node tree, said second node tree corresponding to a second sync point existing in a store of said second peer system;

store said node trees in a store of said first peer system;

analyze metadata to produce a first job list for said first peer and a second job list for said second peer;

said metadata derived from a set of corresponding nodes, said set of corresponding nodes comprising one node from each of said first node tree and said second node tree;

said second job list comprising instructions to synchronize objects in said second sync point with corresponding objects in said first sync point and said second sync point;

said first job list comprising instructions to synchronize objects in said first sync point with corresponding objects in said second sync point and said first sync point;

enact said first job list on said first peer system; and enact said second job list on said second peer system.

40. A method of synchronizing data from a plurality of devices, the method comprising:

determining a loser vector from a first synchronization of a first datum on a first device relative to a corresponding datum on a second device;

maintaining a record of the determined loser vector on a storage device in one or more data stores wherein the one or more data stores further represent an ancestry of the first and corresponding datum;

utilizing the record in a future synchronization between the first device and a synchronization device wherein datum identified as a loser by the record is not selected for synchronization; and communicatively connecting the first device and the synchronization device to a programmable processing device configured to analyze the data stores to automatically perform synchronization of the first and corresponding datum, the synchronization between the first device and the synchronization device.

41. The method of claim 40 wherein maintaining a record of the determined loser vector on a storage device comprises maintaining the record on the first device.

42. The method of claim 40 wherein the second and synchronization devices are the same device.

43. The method of claim 40 wherein the first and storage devices are the same device and the second and synchronization devices are the same device.

44. A device comprising:

a programmable processing unit;

a memory communicatively coupled to the programmable processing unit; and a software sync module stored in the memory, the software sync module for synchronizing data between a plurality of devices, wherein the programmable processing unit executes the software sync module to:

determine a loser vector from a first synchronization of a first datum on a first device relative to a corresponding datum on a second device;

maintain a record of the determined loser vector on a storage device in one or more data stores wherein the one or more data stores further represent a genealogy of the first and corresponding datum;

utilize the record in a future synchronization between the first device and a synchronization device wherein datum identified as a loser by the record is not selected for synchronization; and analyze the data stores to automatically identify if the first datum is selected for synchronization between the first device and the synchronization device.

45. The device of claim 44 wherein the programmable processing unit is configured to maintain the record of the determined loser vector on a storage device by maintaining the record on the first device.

46. The device of claim 44 further programmed to synchronize data when the second and synchronization devices are the same device.

47. The device of claim 44 further programmed to synchronize data when the first and storage devices are the same device and the second and synchronization devices are the same device.

48. A non-transitory computer readable media comprising stored program instructions to configure one or more processing units to:

determine a loser vector from a first synchronization of a first datum on a first device relative to a corresponding datum on a second device;

maintain a record of the determined loser vector on a storage device in one or more data stores wherein the one or more data stores further represent a genealogy of the first and corresponding datum;

utilize the record in a future synchronization between the first device and a synchronization device wherein datum identified as a loser by the record is not selected for synchronization; and analyze the data stores to automatically identify if the first datum is selected for synchronization between the first device and the synchronization device.

49. The non-transitory computer readable media of claim 48 wherein maintaining a record of the determined loser vector on a storage device comprises maintaining the record on the first device.

50. The non-transitory computer readable media of claim 48 wherein the second and synchronization devices are the same device.

51. The non-transitory computer readable media of claim 48 wherein the first and storage devices are the same device and the second and synchronization devices are the same device.

* * * * *